United States Patent
Suzuki et al.

(10) Patent No.: US 10,164,696 B2
(45) Date of Patent: Dec. 25, 2018

(54) TERMINAL DEVICE, BASE STATION DEVICE, COMMUNICATION METHOD, AND INTEGRATED CIRCUIT

(71) Applicant: Sharp Kabushiki Kaisha, Sakai, Osaka (JP)

(72) Inventors: Shoichi Suzuki, Sakai (JP); Tatsushi Aiba, Sakai (JP); Kimihiko Imamura, Sakai (JP); Kazuyuki Shimezawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/740,841

(22) PCT Filed: Jul. 1, 2016

(86) PCT No.: PCT/JP2016/069681
§ 371 (c)(1),
(2) Date: Dec. 29, 2017

(87) PCT Pub. No.: WO2017/006871
PCT Pub. Date: Jan. 12, 2017

(65) Prior Publication Data
US 2018/0191414 A1 Jul. 5, 2018

(30) Foreign Application Priority Data
Jul. 3, 2015 (JP) .................................. 2015-133998

(51) Int. Cl.
*H04B 7/04* (2017.01)
*H04B 7/0456* (2017.01)
(Continued)

(52) U.S. Cl.
CPC ......... *H04B 7/0486* (2013.01); *H04L 5/0053* (2013.01); *H04W 8/22* (2013.01); *H04W 24/10* (2013.01); *H04W 72/042* (2013.01)

(58) Field of Classification Search
CPC ...... H04B 7/0486; H04L 5/0053; H04W 8/22; H04W 24/10; H04W 72/042
See application file for complete search history.

(56) References Cited

U.S. PATENT DOCUMENTS

2013/0095816 A1* 4/2013 Gerstenberger .. H04W 72/0406
455/422.1
2014/0045497 A1* 2/2014 Abe ........................ H04W 8/24
455/435.1
(Continued)

FOREIGN PATENT DOCUMENTS

EP 2 739 107 A1 6/2014
JP 5980380 B1 8/2016

OTHER PUBLICATIONS

Official Communication issued in International Patent Application No. PCT/JP2016/069681, dated Sep. 20, 2016.
(Continued)

*Primary Examiner* — Jaison Joseph
(74) *Attorney, Agent, or Firm* — Keating & Bennett, LLP

(57) ABSTRACT

A terminal device transmits an RI determined by the terminal device, the RI corresponding to PDSCH transmission and corresponding to the number of layers, transmits capability information including first information, second information, third information, and/or fourth information, and receives fifth information, wherein the first information indicates a UE category corresponding to a first maximum number of the layers, the second information indicates a first bandwidth class, the third information indicates a second maximum number of the layers, the fourth information indicates a third maximum number of the layers, the fifth
(Continued)

information indicates a fourth maximum number of the layers, and a fifth maximum number of the layers assumed for determining a bit width for the RI is given by referring to any one of the first maximum number of the layers, the second maximum number of the layers, and the fourth maximum number of the layers.

14 Claims, 22 Drawing Sheets

(51) Int. Cl.
*H04W 8/22* (2009.01)
*H04L 5/00* (2006.01)
*H04W 72/04* (2009.01)
*H04W 24/10* (2009.01)

(56) References Cited

U.S. PATENT DOCUMENTS

| | | | |
|---|---|---|---|
| 2014/0269627 A1* | 9/2014 | Gorokhov | H04W 72/0446 370/336 |
| 2016/0007212 A1 | 1/2016 | Kim et al. | |
| 2017/0245142 A1 | 8/2017 | Takahashi et al. | |
| 2018/0139750 A1* | 5/2018 | Takahashi | H04W 72/0413 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.7.0, Mar. 2015, 660 pages.

"3rd Generation Partnership Project; Technical Specification Group Radio Access Network; Evolved Universal Terrestrial Radio Access (E-UTRA); Physical channels and modulation (Release 12)", 3GPP TS 36.211 V12.5.0, Mar. 2015, pp. 1-136.

"3rd Generation Partnership Project; Technical Specification Group Radio Access Network; Evolved Universal Terrestrial Radio Access (E-UTRA); Multiplexing and channel coding (Release 12)", 3GPP TS 36.212 V12.4.0, Mar. 2015, pp. 1-94.

"3rd Generation Partnership Project; Technical Specification Group Radio Access Network; Evolved Universal Terrestrial Radio Access (E-UTRA); Physical layer procedures (Release 12)", 3GPP TS 36.213 V12.5.0, Mar. 2015, pp. 1-239.

"3rd Generation Partnership Project; Technical Specification Group Radio Access Network; Evolved Universal Terrestrial Radio Access (E-UTRA); User Equipment (UE) radio access capabilities (Release 12)", 3GPP TS 36.306 V12.4.0, Mar. 2015, pp. 1-41.

Intel, "Summary of email discussion [90#01][LTE/CA] MIMO/CSI capability for intra-band contiguous CA", 3GPP TSG RAN WG2 #91, R2-153265, Aug. 24-28, 2015, pp. 1-12.

Huawei, et al.; "Issue on RI Bit Width"; 3GPP TSG-RAN WG4 Meeting #67; R4-132373; May 20-24, 2013; 3 pages.

* cited by examiner

| Transmission Mode (P800) | DCI format (P801) | Transmission scheme of PDSCH corresponding to PDCCH (the number of supported layers) (P802) |
| --- | --- | --- |
| Mode 4 | DCI format 2 | Closed-loop spatial multiplexing (up to 4 layers) or Transmit diversity (1 layer) |
| Mode 5 | DCI format 1D | Multi-user MIMO (1 layer) |
| Mode 6 | DCI format 1B | Closed-loop spatial multiplexing (1 layer) |
| Mode 8 | DCI format 2B | Dual layer transmission (2 layers) or Single-antenna port (1 layer) |
| Mode 9 | DCI format 2C | Up to 8 layer transmission (up to 8 layers) or Single-antenna port (1 layer) |
| Mode 10 | DCI format 2D | Up to 8 layer transmission (up to 8 layers) or Single-antenna port (1 layer) |

FIG. 8

| UE Radio Access Capability parameter (P900) | UE Category (P901) | Total number of soft channel bits (P902) | Maximum number of supported layers for spatial multiplexing in DL (P903) |
|---|---|---|---|
| ue-Category (without suffix) | Category 1 | 250368 | 1 |
| | Category 2 | 1237248 | 2 |
| | Category 3 | 1237248 | 2 |
| | Category 4 | 1827027 | 2 |
| | Category 5 | 3667200 | 4 |
| ue-Category-v1020 | Category 6 | 3654144 | 2 or 4 |
| | Category 7 | 3654144 | 2 or 4 |
| | Category 8 | 35982720 | 8 |
| ue-Category-v1170 | Category 9 | 5481216 | 2 or 4 |
| | Category 10 | 5481216 | 2 or 4 |
| ue-Category-v11a0 | Category 11 | 7308288 | 2 or 4 |
| | Category 12 | 7308288 | 2 or 4 |

FIG. 9

| UE Radio Access Capability parameter (P1000) | UE DL Category (P1001) | Total number of soft channel bits (P1002) | Maximum number of supported layers for spatial multiplexing in DL (P1003) |
|---|---|---|---|
| ue-CategoryDL-r12 | DL Category 0 | 25344 | 1 |
| | DL Category 6 | 3654144 | 2 or 4 |
| | DL Category 7 | 3654144 | 2 or 4 |
| | DL Category 9 | 5481216 | 2 or 4 |
| | DL Category 10 | 5481216 | 2 or 4 |
| | DL Category 11 | 7308288 | 2 or 4 |
| | DL Category 12 | 7308288 | 2 or 4 |
| | DL Category 13 | 3654144 | 2 or 4 |
| | DL Category 14 | 47431680 | 8 |

FIG. 10

| Case | ue-CategoryDL-r12 | ue-Category-v1a0 | ue-Category-v1170 | ue-Category-v1020 | ue-Category (without suffix) |
|---|---|---|---|---|---|
| Case 1 | | | | Category 6 | Category 4 |
| Case 2 | | | | Category 7 | Category 4 |
| Case 3 | | | | Category 8 | Category 5 |
| Case 4 | | | Category 9 | Category 6 | Category 4 |
| Case 5 | | | Category 10 | Category 7 | Category 4 |
| Case 6 | | Category 11 | Category 9 | Category 6 | Category 4 |
| Case 7 | | Category 12 | Category 10 | Category 7 | Category 4 |
| Case 8 | DL Category 0 | | | | |
| Case 9 | DL Category 6 | | | Category 6 | Category 4 |
| Case 10 | DL Category 7 | | | Category 7 | Category 4 |
| Case 11 | DL Category 9 | | Category 9 | Category 6 | Category 4 |
| Case 12 | DL Category 10 | | Category 10 | Category 7 | Category 4 |
| Case 13 | DL Category 11 | Category 11 | Category 9 | Category 6 | Category 4 |
| Case 14 | DL Category 12 | Category 12 | Category 10 | Category 7 | Category 4 |
| Case 15 | DL Category 13 | | | Category 6 or 7 | Category 4 |
| Case 16 | DL Category 14 | | | Category 8 | Category 5 |

FIG. 11

| Bandwidth Class (P1400) | Aggregated Transmission Bandwidth Configuration (P1401) | Number of contiguous component carriers (P1402) |
|---|---|---|
| A | $N_{RB,agg} \leq 100$ | 1 |
| B | $25 < N_{RB,agg} \leq 100$ | 2 |
| C | $100 < N_{RB,agg} \leq 200$ | 2 |
| D | $200 < N_{RB,agg} \leq 300$ | 3 |
| E | $300 < N_{RB,agg} \leq 400$ | 4 |
| F | $400 < N_{RB,agg} \leq 500$ | 5 |

FIG. 12

| ca-BandwidthClassDL-r10 | supportedMIMO-CapabilityDL-r10 | supportedMIMO-CapabilityDL-v10xx |
|---|---|---|
| A | 4 | {4} |
| B | 2 | {4, 2} |
| C | 2 | {4, 2} |
| D | 2 | {2, 2, 2} |

FIG. 15

$$\text{Set } k_0 = R_{subblock} \cdot \left( 2 \cdot \left\lceil \frac{N_{cb}}{8R_{subblock}} \right\rceil \cdot rv_{idx} + 2 \right)$$

Set $k = 0$ and $j = 0$ while $\{ k < E \}$ if $w_{(k_0+j) \bmod N_{cb}} \neq <NULL>$ $e_k = w_{(k_0+j) \bmod N_{cb}}$ $k = k+1$ end if $j = j+1$ end while

FIG. 18

If $N_{soft}$ = 35982720 or 47431680, $K_C$ = 5, elseif $N_{soft}$ = 7308288 and the terminal device is configured by higher layers with *altCQI-Table-r12*, if the maximum number of layers for the downlink component carrier (downlink cell) is no more than 2, $K_C$ = 3 else $K_C$ = 3/2 end if.

elseif $N_{soft}$ = 3654144 and the maximum number of layers for the downlink component carrier (downlink cell) is no more than 2, $K_C$ = 2 else $K_C$ = 1

End if.

FIG. 20

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit.

The present application claims priority based on JP 2015-133998 filed on Jul. 3, 2015, the contents of which are incorporated herein.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied. In LTE, a base station device is also referred to as evolved NodeB (eNodeB), and a terminal device is also referred to as User Equipment (UE). LTE is a cellular communication system in which an area is divided into multiple cells to form a cellular pattern, the area being served by a base station device. A single base station device may manage a plurality of cells.

In LTE, carrier aggregation in which a terminal device communicates with a base station device through a plurality of carriers (cells) aggregated, and Multiple Input Multiple Output (MIMO) in which a plurality of layers are spatial-multiplexed, have been introduced. The MIMO has been introduced since LTE Release 8, and the carrier aggregation has been introduced since LTE Release 10 (NPLs 2, 3, and 4).

In LTE, functions of the MIMO and the carrier aggregation have been continuously extended, even after the introduction of the MIMO and the carrier aggregation. A terminal device transmits, to a base station device, capability information indicating the technology of the MIMO and the carrier aggregation supported by the terminal device (NPL 5).

CITATION LIST

Non-Patent Literature

NPL 1: "3GPP TS 36.101 V12.7.0 (2015-03)", 2 Apr. 2015.
NPL 2: "3GPP TS 36.211 V12.5.0 (2015-03)", 26 Mar. 2015.
NPL 3: "3GPP TS 36.212 V12.4.0 (2015-03)", 26 Mar. 2015.
NPL 4: "3GPP TS 36.213 V12.5.0 (2015-03)", 26 Mar. 2015.
NPL 5: "3GPP TS 36.306 V12.4.0 (2015-03)", 27 Mar. 2015.

DISCLOSURE OF THE INVENTION

Problems to be Solved by the Invention

However, in the above-described radio systems, an actual operation of a base station device and an operation of the base station device assumed by a terminal device may be different, and thus, the base station device and the terminal device sometimes may not correctly communicate with each other. For example, there is a possibility that an actual operation of the base station device and an operation of the base station device assumed by the terminal device and/or an actual operation of the terminal device and an operation of the terminal device assumed by the base station device are different with respect to a bit width of a Rank Indicator (RI) fed back by the terminal device to the base station device, a rate matching of a code block of a downlink transport block, storing of soft channel bits, and the like.

The present invention has been made in light of the foregoing, and an object of the present invention is to provide a terminal device capable of efficiently communicating with a base station device, a base station device, a communication method, and an integrated circuit.

Means for Solving the Problems (1) In order to accomplish the object described above, aspects of the present invention are contrived to provide the following means. That is, a first aspect of the present invention is a terminal device, including: a transmission unit configured to transmit a Rank Indicator (RI) determined by the terminal device, the RI corresponding to Physical Downlink Shared CHannel (PDSCH) transmission in a first downlink component carrier corresponding to a first bandwidth class of a first band in a first band combination and corresponding to the number of useful layers; and a reception unit configured to receive the PDSCH. The transmission unit transmits capability information including first information, second information, and/or third information, and the reception unit receives fifth information for the first downlink component carrier corresponding to the first bandwidth class of the first band in the first band combination. The first information indicates a UE category corresponding to a first maximum number of the layers supported by the terminal device in a downlink; the second information indicates the first bandwidth class being for the first band in the first band combination and corresponding to the number of downlink component carriers supported by the terminal device; the third information is applied to all of one or more downlink component carriers corresponding to the first bandwidth class of the first band in the first band combination, and indicates a second maximum number of the layers supported by the terminal device in the downlink; and the fifth information indicates a fourth maximum number of the layers. In a case that the fifth information for the first downlink component carrier corresponding to the first bandwidth class of the first band in the first band combination is not configured, a fifth maximum number of the layers assumed for determining a bit width for the RI is given by referring to any one of the first information and the third information. In a case that the fifth information for the first downlink component carrier corresponding to the first bandwidth class of the first band in the first band combination is configured, the fifth maximum number of the layers assumed for determining the bit width for the RI is given by referring to the fifth information.

(2) A second aspect of the present invention is a base station device, including: a reception unit configured to receive, from a terminal device, a Rank Indicator (RI) determined by the terminal device, the RI corresponding to Physical Downlink Shared CHannel (PDSCH) transmission in a first downlink component carrier corresponding to a first bandwidth class of a first band in a first band combination and corresponding to the number of useful layers; and a transmission unit configured to transmit the PDSCH to the terminal device. The reception unit receives, from the terminal device, capability information including first information, second information, and/or third information, and the transmission unit transmits, to the terminal device, fifth information for the first downlink component carrier corresponding to the first bandwidth class of the first band in the first band combination. The first information indicates a UE category corresponding to a first maximum number of the layers supported by the terminal device in a downlink; the second information indicates the first bandwidth class being for the first band in the first band combination and corresponding to the number of downlink component carriers supported by the terminal device; the third information is applied to all of one or more downlink component carriers corresponding to the first bandwidth class of the first band in the first band combination, and indicates a second maximum number of the layers supported by the terminal device in the downlink; and the fifth information indicates a fourth maximum number of the layers. In a case that the fifth information for the first downlink component carrier corresponding to the first bandwidth class of the first band in the first band combination is not configured for the terminal device, a fifth maximum number of the layers assumed for determining a bit width for the RI is given by referring to any one of the first information and the third information. In a case that the fifth information for the first downlink component carrier corresponding to the first bandwidth class of the first band in the first band combination is configured for the terminal device, the fifth maximum number of the layers assumed for determining the bit width for the RI is given by referring to the fifth information.

(3) A third aspect of the present invention is a communication method used for a terminal device, the method including the steps of: transmitting a Rank Indicator (RI) determined by the terminal device, the RI corresponding to Physical Downlink Shared CHannel (PDSCH) transmission in a first downlink component carrier corresponding to a first bandwidth class of a first band in a first band combination and corresponding to the number of useful layers; receiving the PDSCH; transmitting capability information including first information, second information, and/or third information; and receiving fifth information for the first downlink component carrier corresponding to the first bandwidth class of the first band in the first band combination. The first information indicates a UE category corresponding to a first maximum number of the layers supported by the terminal device in a downlink; the second information indicates the first bandwidth class being for the first band in the first band combination and corresponding to the number of downlink component carriers supported by the terminal device; the third information is applied to all of one or more downlink component carriers corresponding to the first bandwidth class of the first band in the first band combination, and indicates a second maximum number of the layers supported by the terminal device in the downlink; and the fifth information indicates a fourth maximum number of the layers. In a case that the fifth information for the first downlink component carrier corresponding to the first bandwidth class of the first band in the first band combination is not configured, a fifth maximum number of the layers assumed for determining a bit width for the RI is given by referring to any one of the first information and the third information. In a case that the fifth information for the first downlink component carrier corresponding to the first bandwidth class of the first band in the first band combination is configured, the fifth maximum number of the layers assumed for determining the bit width for the RI is given by referring to the fifth information.

(4) A fourth aspect of the present invention is a communication method used for a base station device, the method including the steps of: receiving, from a terminal device, a Rank Indicator (RI) determined by the terminal device, the RI corresponding to Physical Downlink Shared CHannel (PDSCH) transmission in a first downlink component carrier corresponding to a first bandwidth class of a first band in a first band combination and corresponding to the number of useful layers; transmitting the PDSCH to the terminal device; receiving, from the terminal device, capability information including first information, second information, and/or third information; and transmitting, to the terminal device, fifth information for the first downlink component carrier corresponding to the first bandwidth class of the first band in the first band combination. The first information indicates a UE category corresponding to a first maximum number of the layers supported by the terminal device in a downlink; the second information indicates the first bandwidth class being for the first band in the first band combination and corresponding to the number of downlink component carriers supported by the terminal device; the third information is applied to all of one or more downlink component carriers corresponding to the first bandwidth class of the first band in the first band combination, and indicates a second maximum number of the layers supported by the terminal device in the downlink; and the fifth information indicates a fourth maximum number of the layers. In a case that the fifth information for the first downlink component carrier corresponding to the first bandwidth class of the first band in the first band combination is not configured for the terminal device, a fifth maximum number of the layers assumed for determining a bit width for the RI is given by referring to any one of the first information and the third information. In a case that the fifth information for the first downlink component carrier corresponding to the first bandwidth class of the first band in the first band combination is configured for the terminal device, the fifth maximum number of the layers assumed for determining the bit width for the RI is given by referring to the fifth information.

(5) A fifth aspect of the present invention is an integrated circuit causing a terminal device to exhibit a series of functions including the functions of: transmitting a Rank Indicator (RI) determined by the terminal device, the RI corresponding to Physical Downlink Shared CHannel (PDSCH) transmission in a first downlink component carrier corresponding to a first bandwidth class of a first band in a first band combination and corresponding to the number of useful layers; receiving the PDSCH; transmitting capability information including first information, second information, and/or third information; and receiving fifth information for the first downlink component carrier corresponding to the first bandwidth class of the first band in the first band combination. The first information indicates a UE category corresponding to a first maximum number of the layers supported by the terminal device in a downlink; the second information indicates the first bandwidth class being for the first band in the first band combination and corresponding to the number of downlink component carriers supported by the terminal device; the third information is applied to all of one or more downlink component carriers corresponding to the first bandwidth class of the first band in the first band combination, and indicates a second maximum number of the layers supported by the terminal device in the downlink; and the fifth information indicates a fourth maximum number of the layers. In a case that the fifth information for the first downlink component carrier corresponding to the first bandwidth class of the first band in the first band combination is not configured, a fifth maximum number of the layers assumed for determining a bit width for the RI is given by referring to any one of the first information and the third information. In a case that the fifth information for the first downlink component carrier corresponding to the first bandwidth class of the first band in the first band combination is configured, the fifth maximum number of the layers assumed for determining the bit width for the RI is given by referring to the fifth information.

(6) A fifth aspect of the present invention is an integrated circuit causing a base station device to exhibit a series of functions including the functions of: receiving, from a terminal device, a Rank Indicator (RI) determined by the terminal device, the RI corresponding to Physical Downlink Shared CHannel (PDSCH) transmission in a first downlink component carrier corresponding to a first bandwidth class of a first band in a first band combination and corresponding to the number of useful layers; transmitting the PDSCH to the terminal device; receiving, from the terminal device, capability information including first information, second information, and/or third information; transmitting, from the terminal device, fifth information for the first downlink component carrier corresponding to the first bandwidth class of the first band in the first band combination. The first information indicates a UE category corresponding to a first maximum number of the layers supported by the terminal device in a downlink; the second information indicates the first bandwidth class being for the first band in the first band combination and corresponding to the number of downlink component carriers supported by the terminal device; the third information is applied to all of one or more downlink component carriers corresponding to the first bandwidth class of the first band in the first band combination, and indicates a second maximum number of the layers supported by the terminal device in the downlink; and the fifth information indicates a fourth maximum number of the layers. In a case that the fifth information for the first downlink component carrier corresponding to the first bandwidth class of the first band in the first band combination is not configured for the terminal device, a fifth maximum number of the layers assumed for determining a bit width for the RI is given by referring to any one of the first information and the third information. In a case that the fifth information for the first downlink component carrier corresponding to the first bandwidth class of the first band in the first band combination is configured for the terminal device, the fifth maximum number of the layers assumed for determining the bit width for the RI is given by referring to the fifth information.

Effects of the Invention

According to the aspects of the present invention, a terminal device and a base station device can efficiently communicate with each other.

BRIEF DESCRIPTION OF THE DRAWINGS

FIG. 8 is a table showing one example of a correspondence of a transmission mode, a DCI format, and a PDSCH transmission scheme according to the present embodiment.

FIG. 9 is a table showing one example of a UE category according to the present embodiment.

FIG. 10 is a table showing one example of a downlink UE category according to the present embodiment.

FIG. 11 is a table showing one example of a combination of categories indicated by a plurality of capability parameters according to the present embodiment.

FIG. 12 is a table showing one example of a bandwidth class according to the present embodiment.

FIG. 15 is a table showing one example of a combination of the bandwidth class and a MIMO capability according to the present embodiment.

FIG. 18 illustrates one example of a bit selection and pruning according to the present embodiment.

FIG. 20 illustrates one example of a method of configuring $K_c$ according to the present embodiment.

MODE FOR CARRYING OUT THE INVENTION

Hereinafter, embodiments of the present invention will be described.

In the present embodiment, a plurality of cells are configured for a terminal device. A technology in which the terminal device communicates through a plurality of cells is referred to as cell aggregation or carrier aggregation. The present invention may be applied to each of the plurality of cells configured for the terminal device. Furthermore, the present invention may be applied to some of the plurality of configured cells. Each of the cells configured for the terminal device 1 is also referred to as a serving cell. Any one of Time Division Duplex (TDD) scheme and Frequency Division Duplex (TDD) scheme is applied to each cell.

The plurality of configured serving cells include one primary cell (PCell) and one or more secondary cells (SCells). The primary cell is a serving cell in which an initial connection establishment procedure has been performed, a serving cell in which a connection re-establishment procedure has been started, or a cell indicated as a primary cell during a handover procedure. The secondary cell may be configured at a point in time when a radio resource control (RRC) connection is established, or later.

A carrier corresponding to a cell in the downlink is referred to as a downlink component carrier. A carrier corresponding to a cell in the uplink is referred to as an uplink component carrier. The component carriers include a transmission bandwidth configuration. For example, the transmission bandwidth configuration is 1.4 MHz, 5 MHz, 10 MHz, 15 MHz, or 20 MHz.

Figure 1:
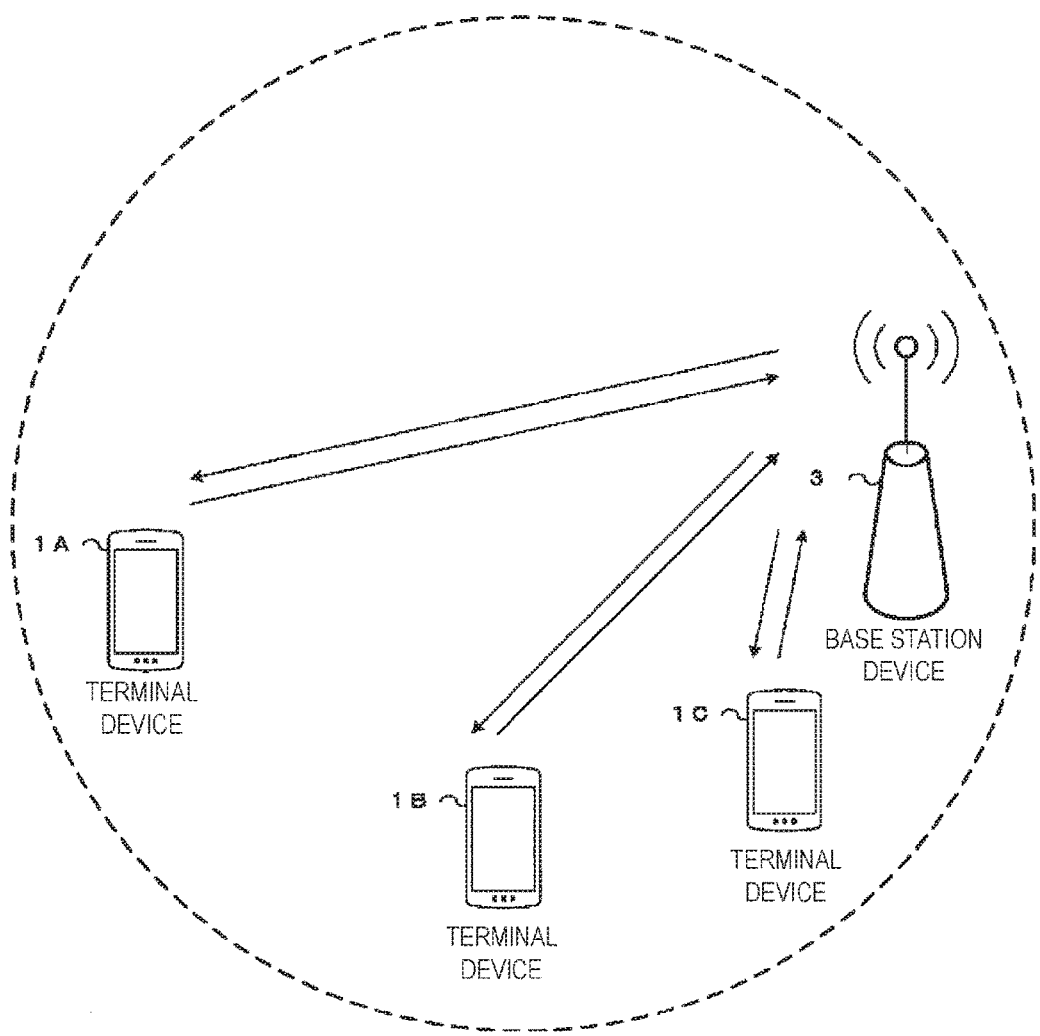
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. The terminal devices 1A to 1C are each referred to as a terminal device 1, below.

Physical channels and physical signals of the present embodiment will be described.

In FIG. 1, in uplink radio communication from the terminal device 1 to the base station device 3, the following uplink physical channels are used. The uplink physical channel is used to transmit information output from a higher layer.

Physical Uplink Control Channel (PUCCH)
Physical Uplink Shared Channel (PUSCH)
Physical Random Access Channel (PRACH)

The PUCCH is a physical channel that is used to transmit Uplink Control Information (UCI). The pieces of uplink control information include downlink Channel State Information (CSI), a Scheduling Request (SR) indicating a request for a PUSCH resource, and an acknowledgement (ACK)/negative-acknowledgement (NACK) for downlink data (a Transport Block or a Downlink-Shared Channel (DL-SCH)). The ACK/NACK is also referred to as an HARQ-ACK, HARQ feedback, or response information.

The channel state information includes a Channel Quality Indicator (CQI), a Rank Indicator (RI), and a Precoding Matrix Indicator (PMI). The CQI expresses a combination of a modulation scheme and a coding rate for a single transport block to be transmitted on the PDSCH. The RI indicates the number of useful layers determined by the terminal device 1. The PMI indicates a code book determined by the terminal device 1. The code book is correlated with a precoding of the PDSCH.

The PUSCH is a physical channel that is used to transmit uplink data (Uplink-Shared Channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

The PRACH is a physical channel that is used to transmit a random access preamble.

In FIG. 1, the following uplink physical signal is used in the uplink radio communication. The uplink physical signal is not used to transmit information output from the higher layer, but is used by a physical layer.

Uplink Reference Signal (UL RS)

In the present embodiment, the following two types of uplink reference signals are used.

Demodulation Reference Signal (DMRS)
Sounding Reference Signal (SRS)

The DMRS is associated with transmission of the PUSCH or the PUCCH. The SRS has no association with the transmission of the PUSCH or the PUCCH.

In FIG. 1, the following downlink physical channels are used for downlink radio communication from the base station device 3 to the terminal device 1. The downlink physical channels are used to transmit the information output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used to broadcast a Master Information Block (MIB), or a Broadcast Channel (BCH), that is shared by the terminal devices 1. The MIB is transmitted at intervals of 40 ms, and, within the interval, the MIB is repeatedly transmitted every 10 ms. Specifically, initial transmission of the MIB is performed in a subframe 0 in a radio frame that satisfies SFN mod 4=0, and re-transmission (repetition) of the MIB is performed in subframes 0 in all the other radio frames. A system frame number (SFN) is a radio frame number. The MIB is system information. For example, the MIB includes information indicating the SFN. The PBCH is transmitted on some or all of the transmit antenna ports 0 to 3.

The PCFICH is used to transmit information indicating a region (OFDM symbols) to be used for transmission of the PDCCH.

The PHICH is used to transmit an HARQ indicator (HARQ feedback or response information) indicating an acknowledgement (ACK) or a negative acknowledgement (NACK) with respect to the uplink data (Uplink Shared Channel (UL-SCH)) received by the base station device 3.

The PDCCH and the EPDCCH are used to transmit Downlink Control Information (DCI). The downlink control information is also referred to as a DCI format. The downlink control information includes a downlink grant and an uplink grant. The downlink grant is also referred to as downlink assignment or downlink allocation.

The downlink grant is used for scheduling of a single PDSCH within a single cell. The downlink grant is used for scheduling of the PDSCH within the same subframe as the subframe in which the downlink grant is transmitted. The uplink grant is used for scheduling of a single PUSCH within a single cell. The uplink grant is used for scheduling of a single PUSCH within the fourth or later subframe from the subframe in which the uplink grant is transmitted.

A Cyclic Redundancy Check (CRC) parity bits are attached to the DCI format. The CRC parity bits are scrambled with a Cell-Radio Network Temporary Identifier (C-RNTI) or a Semi Persistent Scheduling Cell-Radio Network Temporary Identifier (SPS C-RNTI). The C-RNTI and the SPS C-RNTI are identifiers for identifying the terminal device 1 within a cell. The C-RNTI is used to control the PDSCH or the PUSCH in a single subframe. The SPS C-RNTI is used to periodically allocate a resource for the PDSCH or the PUSCH.

The PDSCH is used to transmit downlink data (Downlink Shared Channel (DL-SCH)).

The PMCH is used to transmit multicast data (Multicast Channel (MCH)).

In FIG. 1, the following downlink physical signals are used in the downlink radio communication. The downlink physical signals are not used to transmit the information output from the higher layer, but are used by the physical layer.

Synchronization signal (SS)

Downlink reference signal (DL RS)

The synchronization signal is used in order for the terminal device 1 to be synchronized in terms of frequency and time domains for downlink.

The downlink reference signal is used in order for the terminal device 1 to perform the channel compensation of the downlink physical channel. The downlink reference signal is used in order for the terminal device 1 to calculate the downlink channel state information.

According to the present embodiment, the following five types of downlink reference signals are used.

Cell-specific Reference Signal (CRS)

UE-specific Reference Signal (URS) associated with the PDSCH

Demodulation Reference Signal (DMRS) associated with the EPDCCH

Non-Zero Power Chanel State Information-Reference Signal (NZP CSI-RS)

Zero Power Chanel State Information-Reference Signal (ZP CSI-RS)

Multimedia Broadcast and Multicast Service over Single Frequency Network Reference signal (MBSFN RS)

Positioning Reference Signal (PRS)

The CRS is transmitted in the entire band of a subframe. The CRS is used to perform demodulation of the PBCH/PDCCH/PHICH/PCFICH/PDSCH. The CRS may be used in order for the terminal device 1 to calculate the downlink channel state information. The PBCH/PDCCH/PHICH/PCFICH is transmitted on an antenna port used for transmission of the CRS.

The URS relating to the PDSCH is transmitted in a subframe and in a band that are used for transmission of the PDSCH to which the URS relates. The URS is used to demodulate the PDSCH to which the URS relates.

The PDSCH is transmitted on an antenna port used for transmission of the CRS or the URS. For example, a DCI format 1A is used to schedule the PDSCH transmitted on the antenna port used for the transmission of the CRS. For example, a DCI format 2B, a DCI format 2C, and a DCI format 2D are used to schedule the PDSCH transmitted on the antenna port used for the transmission of the URS.

The DMRS relating to the EPDCCH is transmitted in a subframe and in a band that are used for transmission of the EPDCCH to which the DMRS relates. The DMRS is used to demodulate the EPDCCH to which the DMRS relates. The EPDCCH is transmitted on an antenna port used for transmission of the DMRS.

The NZP CSI-RS is transmitted in a subframe that is configured. A resource in which the NZP CSI-RS is transmitted is configured by the base station device. The NZP CSI-RS is used in order for the terminal device 1 to calculate the downlink channel state information. The terminal device 1 uses the NZP CSI-RS to perform signal measurement (channel measurement). The NZP CSI-RS is transmitted on some or all of the transmit antenna ports 15 to 22. The terminal device 1 configures/specifies the transmit antenna port for the NZP CSI-RS transmission based on information received from the base station device 3.

A resource for the ZP CSI-RS is configured by the base station device 3. With zero output, the base station device 3 transmits the ZP CSI-RS. To be more precise, the base station device 3 does not transmit the ZP CSI-RS. The base station device 3 transmits neither the PDSCH nor the EPDCCH in a resource configured for the ZP CSI-RS. For example, in a certain cell, the terminal device 1 can measure interference in a resource to which the NZP CSI-RS corresponds.

The MBSFN RS is transmitted in the entire band of a subframe used for transmission of the PMCH. The MBSFN RS is used to demodulate the PMCH. The PMCH is transmitted on the antenna port used for transmission of the MBSFN RS.

The PRS may be used for the measurement of a reference signal time difference (RSTD). The RSTD is defined by a relative timing difference between a neighbor cell and a reference cell.

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in the Medium Access Control (MAC) layer is referred to as a transport channel. The unit of the transport channel used in the MAC layer is referred to as a transport block (TB) or a MAC Protocol Data Unit (PDU). In the MAC layer, control of Hybrid Automatic Repeat reQuest (HARQ) is performed for each transport block. The transport block is a unit of data that the MAC layer delivers to the physical layer. In the physical layer, the transport block is mapped to a code word, and coding processing is performed on a code word-by-code word basis.

A configuration of the radio frame according to the present embodiment will be described below.

Figure 2:
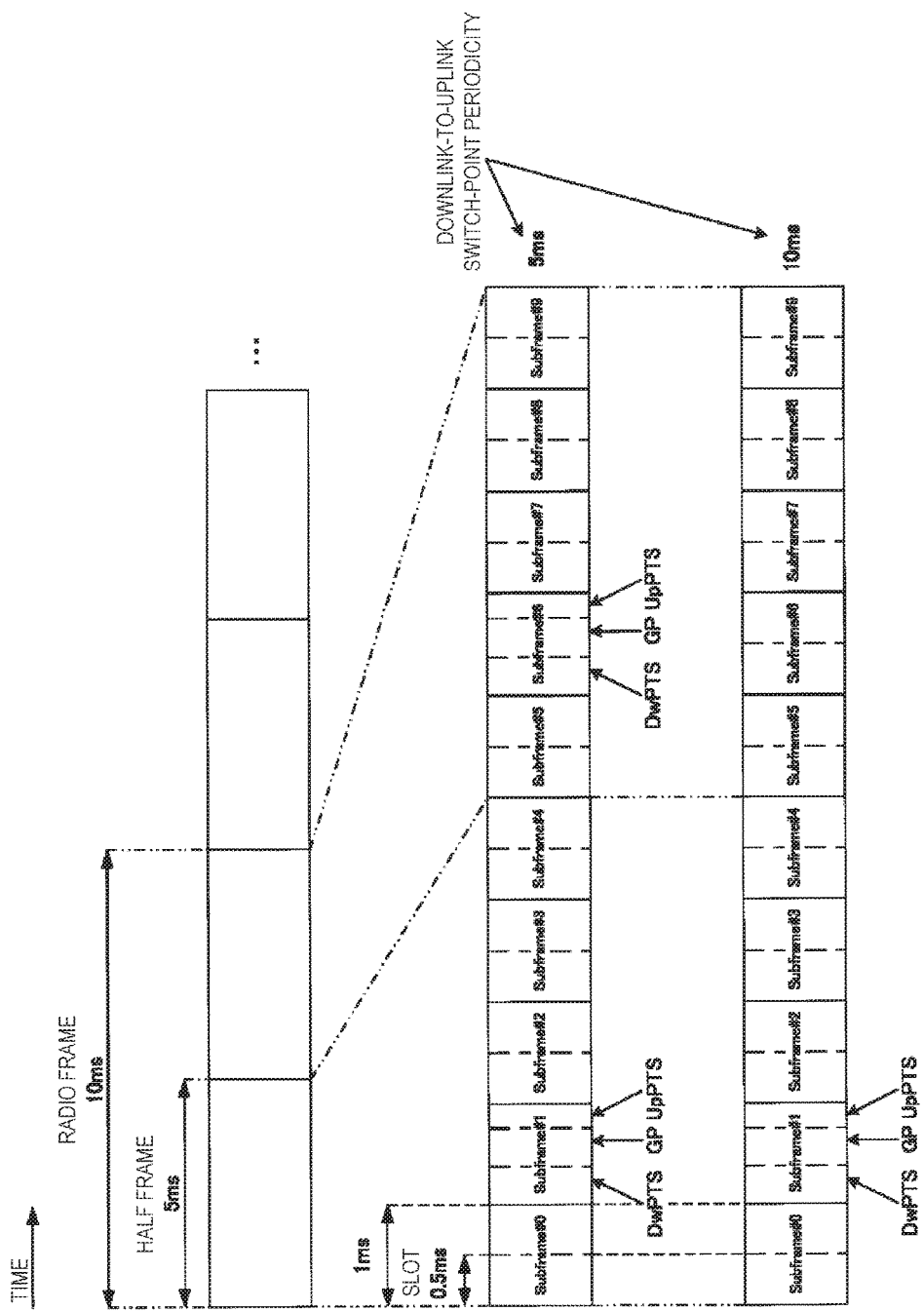
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms in length. In FIG. 2, the horizontal axis is a time axis. Furthermore, each of the radio frames is constituted of two half frames. Each of the half frames is 5 ms in length. Each of the half frames is constituted of five subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. To be more precise, 10 subframes can be utilized at each interval of 10 ms.

According to the present embodiment, the following three types of subframes are defined.

Downlink subframe (a first subframe)

Uplink subframe (a second subframe)

Special subframe (a third subframe)

The downlink subframe is a subframe reserved for the downlink transmission. The uplink subframe is a subframe reserved for the uplink transmission. The special subframe is constituted of three fields. The three fields are a downlink pilot time slot (DwPTS), a guard period (GP), and an uplink pilot time slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted of only the DwPTS and the GP, or may be constituted of only the GP and the UpPTS.

A single radio frame is constituted of at least the downlink subframe, the uplink subframe, and the special subframe.

The radio communication system according to the present embodiment supports 5 ms downlink-to-uplink switch-point periodicity and 10 ms downlink-to-uplink switch-point periodicity. In a case where the downlink-to-uplink switch-point periodicity is 5 ms, both of the half frames within the radio frame include the special subframe. In another case where the downlink-to-uplink switch-point periodicity is 10 ms, only the first half frame within the radio frame includes the special subframe.

A configuration of a slot of the present embodiment will be described below.

Figure 3:
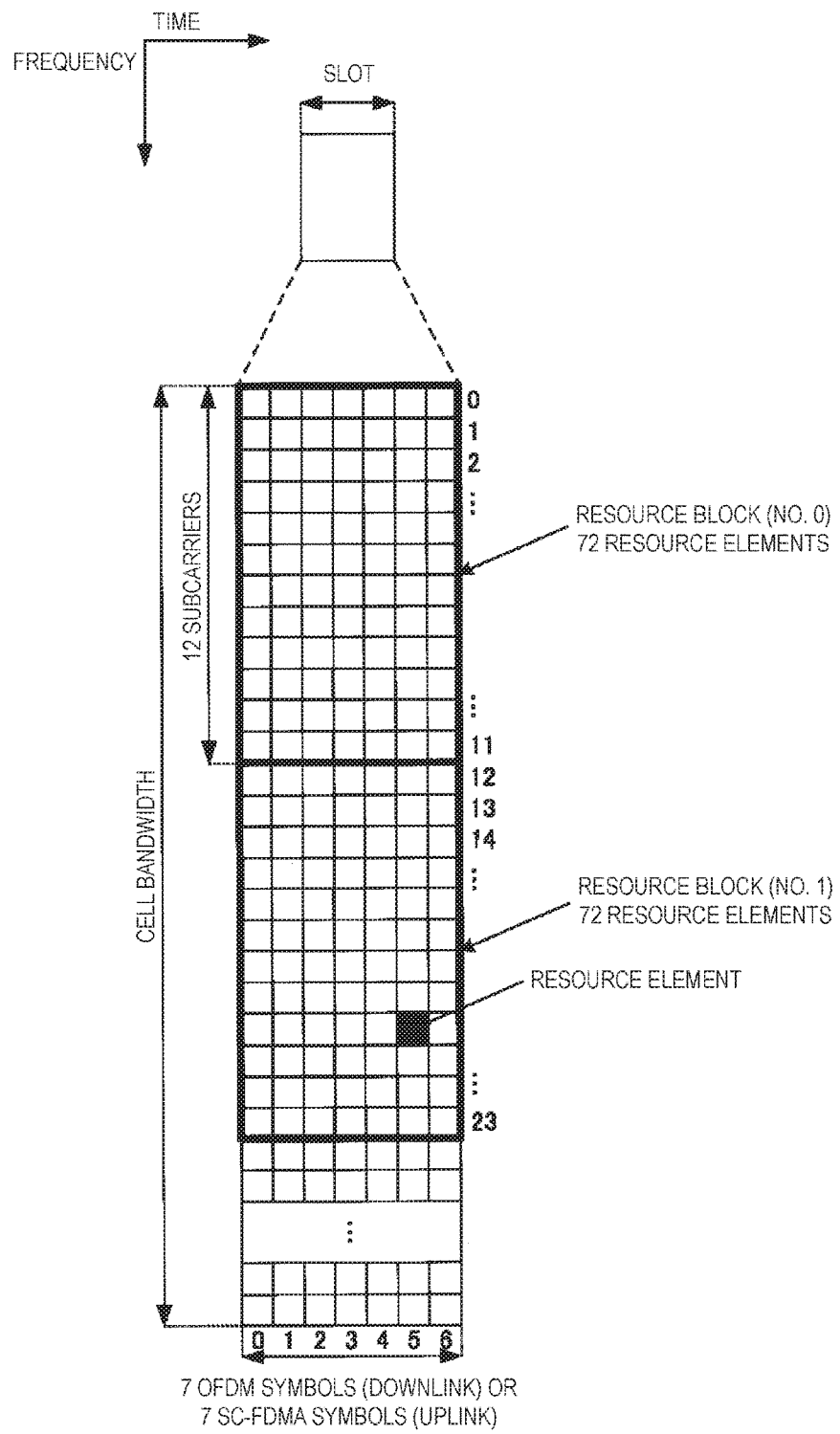
FIG. 3 is a diagram illustrating a configuration of a slot according to the present embodiment.

FIG. 3 is a diagram illustrating a configuration of a slot according to the present embodiment. According to the present embodiment, a normal Cyclic Prefix (CP) is applied to an OFDM symbol. Moreover, an extended Cyclic Prefix (CP) may be applied to the OFDM symbol. The physical signal or the physical channel transmitted in each of the slots is expressed by a resource grid. In FIG. 3, the horizontal axis is a time axis, and the vertical axis is a frequency axis. In downlink, the resource grid is defined by a plurality of subcarriers and a plurality of OFDM symbols. In uplink, the resource grid is defined by a plurality of subcarriers and a plurality of SC-FDMA symbols. The number of subcarriers constituting one slot depends on a cell bandwidth. The number of OFDM symbols or SC-FDMA symbols constituting one slot is seven. Each element within the resource grid is referred to as a resource element. The resource element is identified by using a subcarrier number, and an OFDM symbol or SC-FDMA symbol number.

A resource block is used to express mapping of a certain physical channel (the PDSCH, the PUSCH, or the like) to resource elements. For the resource block, a virtual resource block and a physical resource block are defined. A certain physical channel is first mapped to the virtual resource block. Thereafter, the virtual resource block is mapped to the physical resource block. One physical resource block is defined by seven consecutive OFDM symbols or SC-FDMA symbols in a time domain and by 12 consecutive subcarriers in a frequency domain. Therefore, one physical resource block is constituted of (7×12) resource elements. Furthermore, one physical resource block corresponds to one slot in the time domain and corresponds to 180 kHz in the frequency domain. Physical resource blocks are numbered from 0 in the frequency domain.

Figure 4:
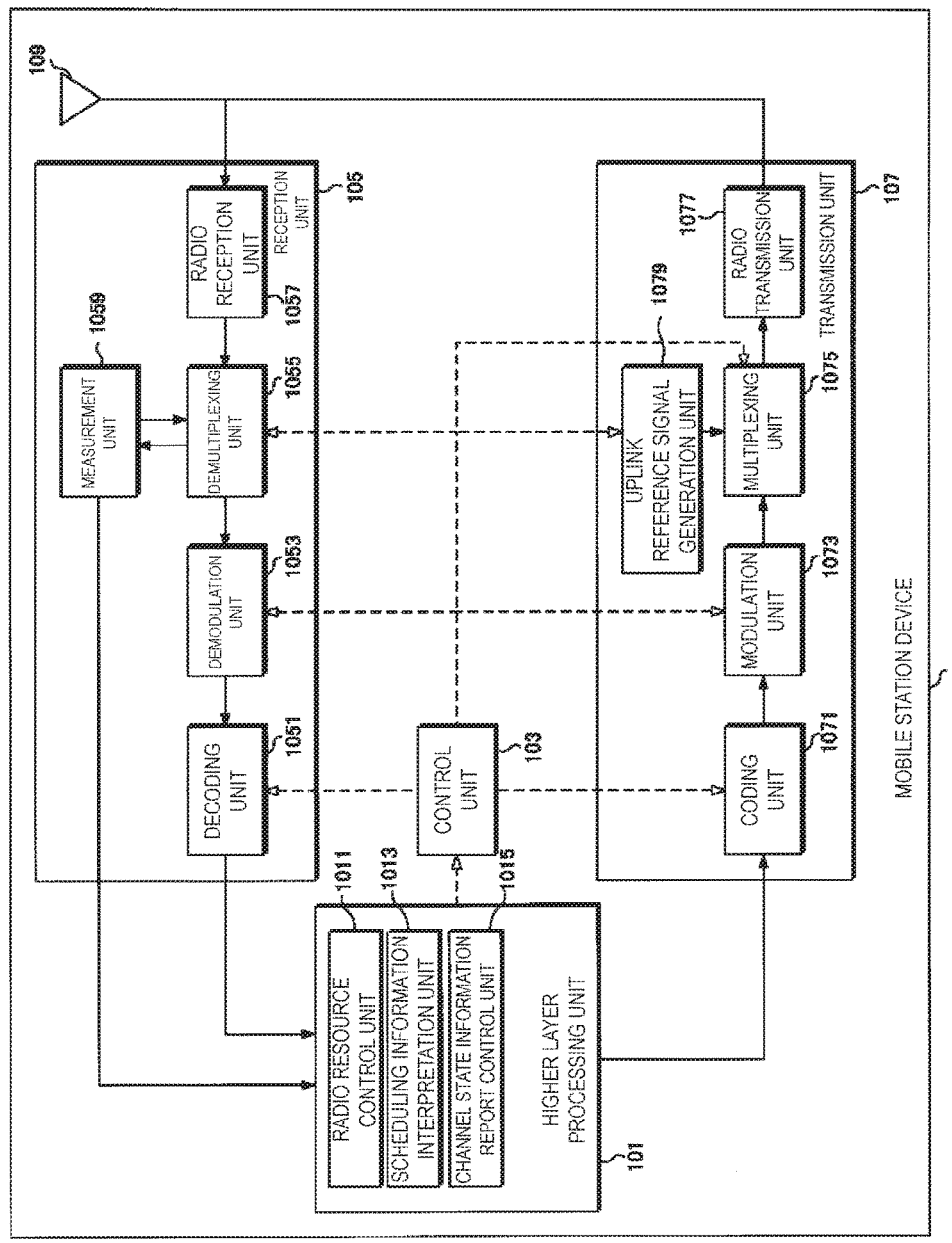
FIG. 4 is a schematic block diagram illustrating a configuration of a terminal device 1 according to the present embodiment.

FIG. 4 is a schematic block diagram illustrating a configuration of the terminal device 1 of the present embodiment. As is illustrated, the terminal device 1 is configured to include a higher layer processing unit 101, a control unit 103, a reception unit 105, a transmission unit 107, and a transmit and receive antenna 109. Furthermore, the higher layer processing unit 101 is configured to include a radio resource control unit 1011, a scheduling information interpretation unit 1013, and a channel state information (CSI) report control unit 1015. Furthermore, the reception unit 105 is configured to include a decoding unit 1051, a demodulation unit 1053, a demultiplexing unit 1055, a radio reception unit 1057, and a measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the Medium Access Control (MAC) layer, a Packet Data Convergence Protocol (PDCP) layer, a Radio Link Control (RLC) layer, and a Radio Resource Control (RRC) layer.

The radio resource control unit 1011 included in the higher layer processing unit 101 manages various pieces of configuration information of the terminal device 1 itself. Furthermore, the radio resource control unit 1011 generates information to be mapped to each uplink channel, and outputs the generated information to the transmission unit 107.

The scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The CSI report control unit 1015 instructs the measurement unit 1059 to derive channel state information (RI/PMI/CQI) relating to the CSI reference resource. The CSI report control unit 1015 instructs the transmission unit 107 to transmit the RI/PMI/CQI. The CSI report control unit 1015 sets a configuration that is used when the measurement unit 1059 calculates the CQI.

The control unit 103 generates a control signal for control of the reception unit 105 and the transmission unit 107, based on the control information originating from the higher layer processing unit 101. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna 109, and outputs the resulting information to the higher layer processing unit 101.

The radio reception unit 1057 converts (down-converts) a downlink signal received through the transmit and receive antenna 109 into a signal of an intermediate frequency, removes unnecessary frequency components, controls an amplification level in such a manner as to suitably maintain a signal level, performs orthogonal demodulation, based on an in-phase component and an orthogonal component of the received signal, and converts the resulting orthogonally-demodulated analog signal into a digital signal. The radio reception unit 1057 removes a portion corresponding to a Guard Interval (GI) from the digital signal resulting from the conversion, performs Fast Fourier Transform (FFT) on the signal from which the guard interval has been removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 makes a compensation of channels including the PHICH, the PDCCH, the EPDCCH, and the PDSCH, from a channel estimate input from the measurement unit 1059. Furthermore, the demultiplexing unit 1055 outputs the downlink reference signal resulting from the demultiplexing, to the measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data based on information on a coding rate notified with the downlink control information, and outputs, to the higher layer processing unit 101, the downlink data (the transport block) resulting from the decoding.

The measurement unit 1059 performs measurement of a downlink pathloss, a channel measurement, and/or an interference measurement from the downlink reference signal input from the demultiplexing unit 1055. The measurement unit 1059 outputs the channel state information calculated based on the measurement result and the measurement result to the higher layer processing unit 101. Furthermore, the measurement unit 1059 calculates a downlink channel estimate from the downlink reference signal and outputs the calculated downlink channel estimate to the demultiplexing unit 1055.

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and receive antenna 109.

The coding unit 1071 codes the uplink control information and the uplink data input from the higher layer processing unit 101. The modulation unit 1073 modulates the coding bits input from the coding unit 1071, in compliance with the modulation scheme such as BPSK, QPSK, 16 QAM, or 64 QAM.

The uplink reference signal generation unit 1079 generates a sequence acquired according to a rule (formula) prescribed in advance, based on a physical cell identifier (also referred to as a physical cell identity (PCI), a CELL ID, or the like) for identifying the base station device 3, a bandwidth to which the uplink reference signal is mapped, a cyclic shift notified with the uplink grant, a parameter value for generation of a DMRS sequence, and the like.

Based on the information used for the scheduling of the PUSCH, the multiplexing unit 1075 determines the number of data sequences to be spatial-multiplexed, maps a plurality of pieces of uplink data to be transmitted on the same PUSCH to a plurality of sequences through multiple input multiple output spatial multiplexing (MIMO SM), and performs precoding on the sequences.

In accordance with the control signal input from the control unit 103, the multiplexing unit 1075 performs Discrete Fourier Transform (DFT) on the modulation symbols of the PUSCH. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, performs modulation in compliance with an SC-FDMA scheme, attaches the guard interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

Figure 5:
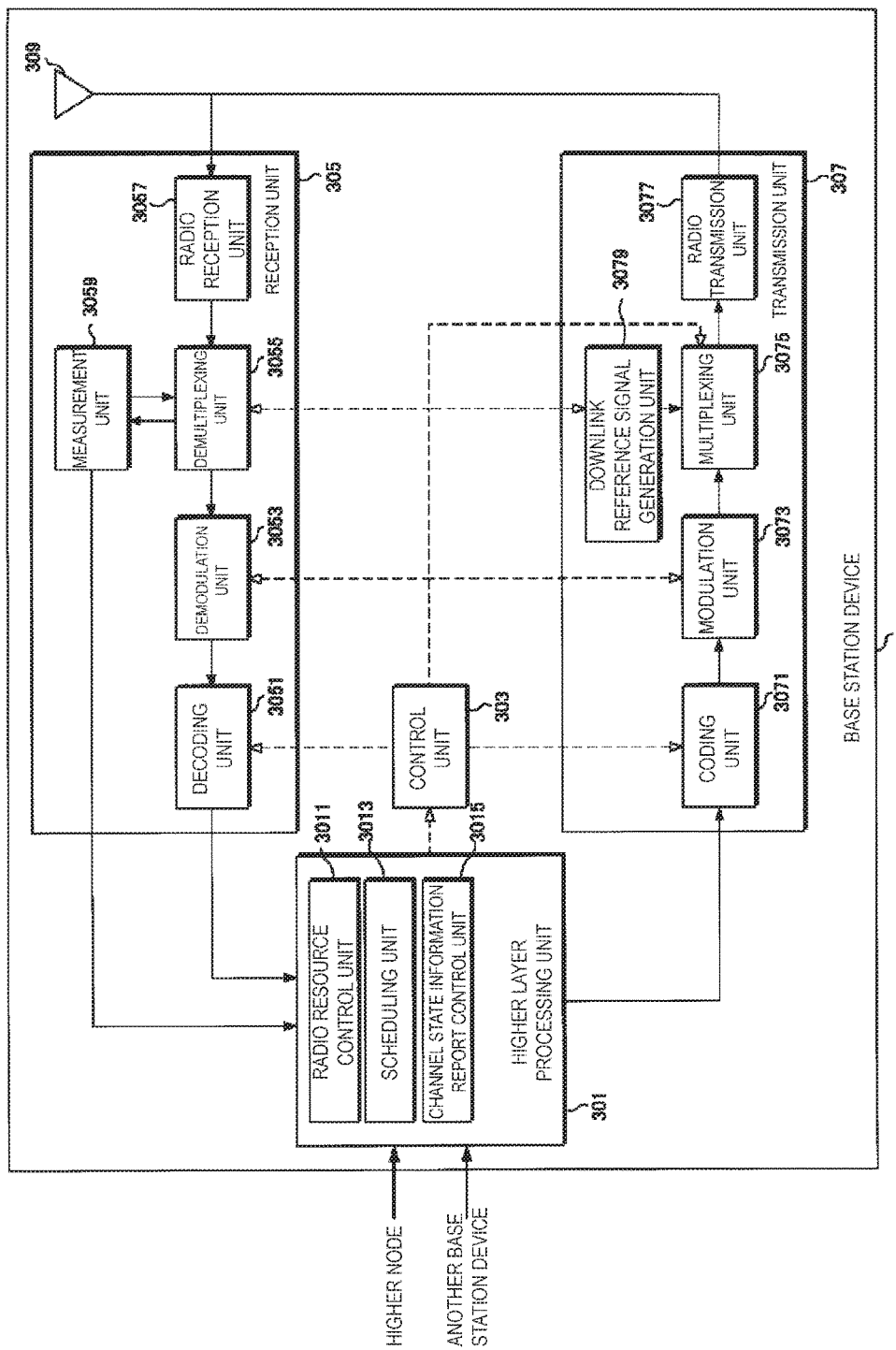
FIG. 5 is a schematic block diagram illustrating a configuration of a base station device 3 according to the present embodiment.

FIG. 5 is a schematic block diagram illustrating a configuration of the base station device 3 according to the present embodiment. As is illustrated, the base station device 3 is configured to include a higher layer processing unit 301, a control unit 303, a reception unit 305, a transmission unit 307, and a transmit and receive antenna 309. The higher layer processing unit 301 is configured to include a radio resource control unit 3011, a scheduling unit 3013, and a CSI report control unit 3015. The reception unit 105 is configured to include a decoding unit 3051, a demodulation unit 3053, a demultiplexing unit 3055, a radio reception unit 3057, and a measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) arranged in the downlink PDSCH, system information, the RRC message, the MAC control element (CE), and the like, and outputs a result of the generation or the acquirement to the transmission unit 307. Furthermore, the radio resource control unit 3011 manages various configuration information for each of the terminal devices 1.

The scheduling unit 3013 included in the higher layer processing unit 301 determines a frequency and a subframe to which the physical channels (the PDSCH and the PUSCH) are allocated, the coding rate and modulation scheme for the physical channels (the PDSCH and the PUSCH), the transmit power, and the like, from the received channel state information and from the channel estimate, channel quality, or the like input from the channel measurement unit 3059. The scheduling unit 3013 generates the control information in order to control the reception unit 305 and the transmission unit 307 in accordance with a result of the scheduling, and outputs the generated information to the control unit 303. The scheduling unit 3013 generates information (for example, a DCI format) to be used for the scheduling of the physical channels (the PDSCH and the PUSCH), based on the result of the scheduling.

The CSI report control unit 3015 included in the higher layer processing unit 301 controls a CSI report that is made by the terminal device 1. The CSI report control unit 3015 transmits information that is assumed in order for the terminal device 1 to derive a RI/PMI/CQI in the CSI reference resource and that shows various configurations, to the terminal device 1 through the transmission unit 307.

The control unit 303 generates a control signal for controlling the reception unit 305 and the transmission unit 307, based on the control information originating from the higher layer processing unit 301. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and receive antenna 309, and outputs information resulting from the decoding to the higher layer processing unit 301. The radio reception unit 3057 converts (down-converts) an uplink signal received through the transmit and receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the Guard Interval (GI) from the digital signal resulting from the conversion. The radio reception unit 3057 performs Fast Fourier Transform (FFT) on the signal from which the guard interval has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. Note that the demultiplexing is performed, based on radio resource allocation information that is determined in advance by the base station device 3 using the radio resource control unit 3011 and that is included in the uplink grant notified to each of the terminal devices 1. Furthermore, the demultiplexing unit 3055 makes a compensation of channels including the PUCCH and the PUSCH from the channel estimate input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme prescribed in advance, such as Binary Phase Shift Keying (BPSK), QPSK, 16 QAM, or 64 QAM, or in compliance with the modulation scheme that the base station device 3 itself notifies in advance each of the terminal devices 1 with the uplink grant. The demodulation unit 3053 demultiplexes the modulation symbols of a plurality pieces of uplink data transmitted on the identical PUSCH with the MIMO SM, based on the number of spatial-multiplexed sequences notified in advance with the uplink grant to each of the terminal devices 1 and information indicating the precoding to be performed on the sequences.

The decoding unit 3051 decodes the coding bits of the PUCCH and the PUSCH, which have been demodulated, at the coding rate in compliance with a coding scheme prescribed in advance, the coding rate being prescribed in advance or being notified in advance with the uplink grant to the terminal device 1 by the base station device 3 itself, and outputs the decoded uplink data and uplink control information to the higher layer processing unit 101. In a case that the PUSCH is re-transmitted, the decoding unit 3051 performs the decoding with the coding bits input from the higher layer processing unit 301 and retained in an HARQ buffer, and the demodulated coding bits. The measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal device 1 through the transmit and receive antenna 309.

The coding unit 3071 codes the HARQ indicator, the downlink control information, and the downlink data input from the higher layer processing unit 301. The modulation unit 3073 modulates the coding bits input from the coding unit 3071, in compliance with the modulation scheme, such as BPSK, QPSK, 16 QAM, or 64 QAM.

The downlink reference signal generation unit 3079 generates, as the downlink reference signal, a sequence that is already known to the terminal device 1 and that is acquired in accordance with a rule prescribed in advance, based on the physical cell identifier (PCI) for identifying the base station device 3, and the like.

In accordance with the number of PDSCH layers to be spatial-multiplexed, the multiplexing unit 3075 maps one or more downlink data transmitted on one PUSCH to one or more layers, and performs a precoding for the one or more layers. The multiplexing unit 375 multiplexes a signal of the downlink physical channel and the downlink reference signal for each transmit antenna port. The multiplexing unit 375 arranges the signal of the downlink physical channel and the downlink reference signal to the resource element for each transmit antenna port.

The radio transmission unit 3077 performs Inverse Fast Fourier Transform (IFFT) on the modulation symbol resulting from the multiplexing or the like, performs the modulation in compliance with an OFDM scheme to generate an OFDM symbol, attaches the guard interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and receive antenna 309 for transmission.

Figure 6:
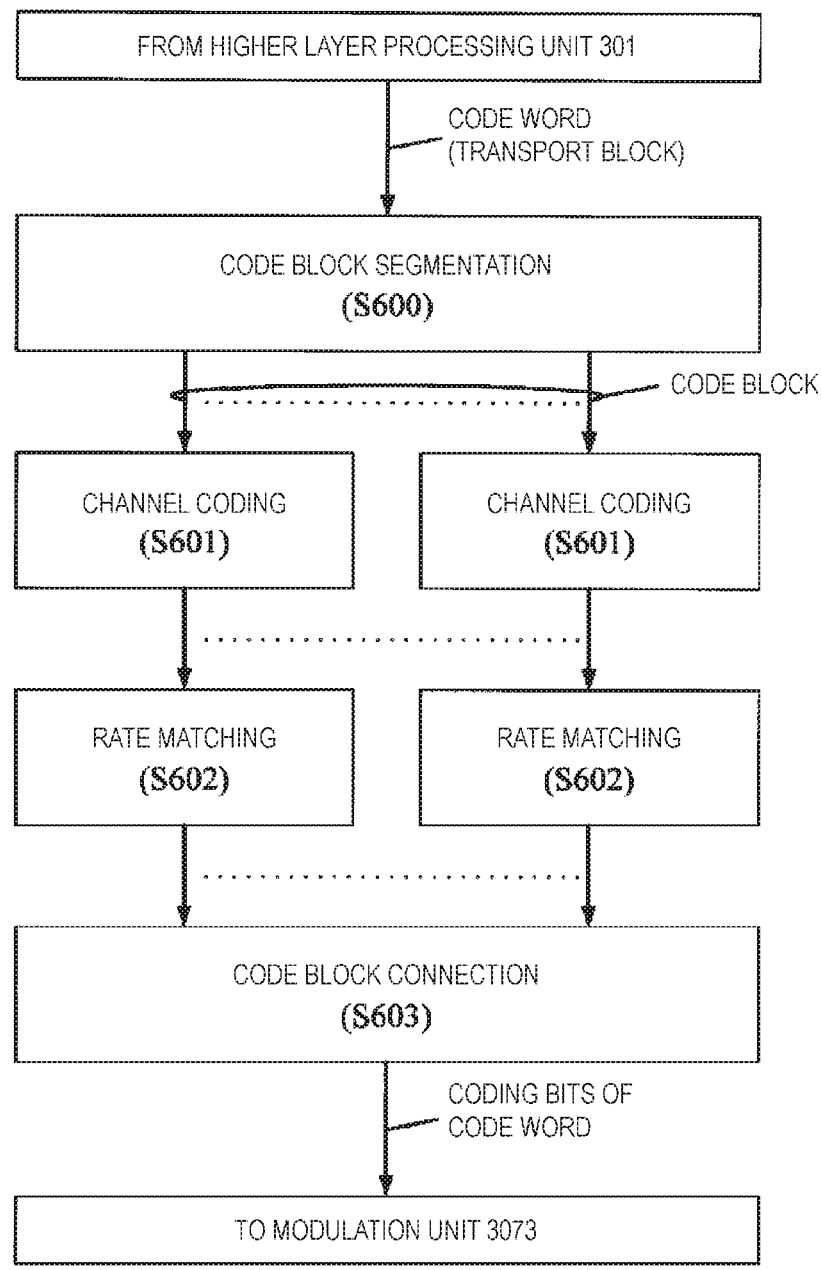
FIG. 6 is a diagram illustrating one example of processing in a coding unit 3071 according to the present embodiment.

FIG. 6 is a diagram illustrating one example of processing in the coding unit 3071 according to the present embodiment. The coding unit 3071 may apply the processing of FIG. 6 to each of transport blocks. One transport block is mapped to one code word. That is, coding of a transport block is identical to coding of a code word.

After attaching corresponding CRC parity bits to one code word input from the higher layer processing unit 301, the coding unit 3071 divides the code word into one or more code blocks (S600). The corresponding CRC parity bits may be attached to each of the code blocks.

Each of the one or more code blocks is coded (for example, turbo-coded or convolutional-coded) (S601). A rate matching is applied to each of a sequence of coding bits of the code blocks (S602). A sequence of coding bits of a code word is obtained by connecting the one or more code blocks to which the rate matching is applied (S603). The sequence of the coding bits of the code word is output to the modulation unit 3073.

Figure 7:
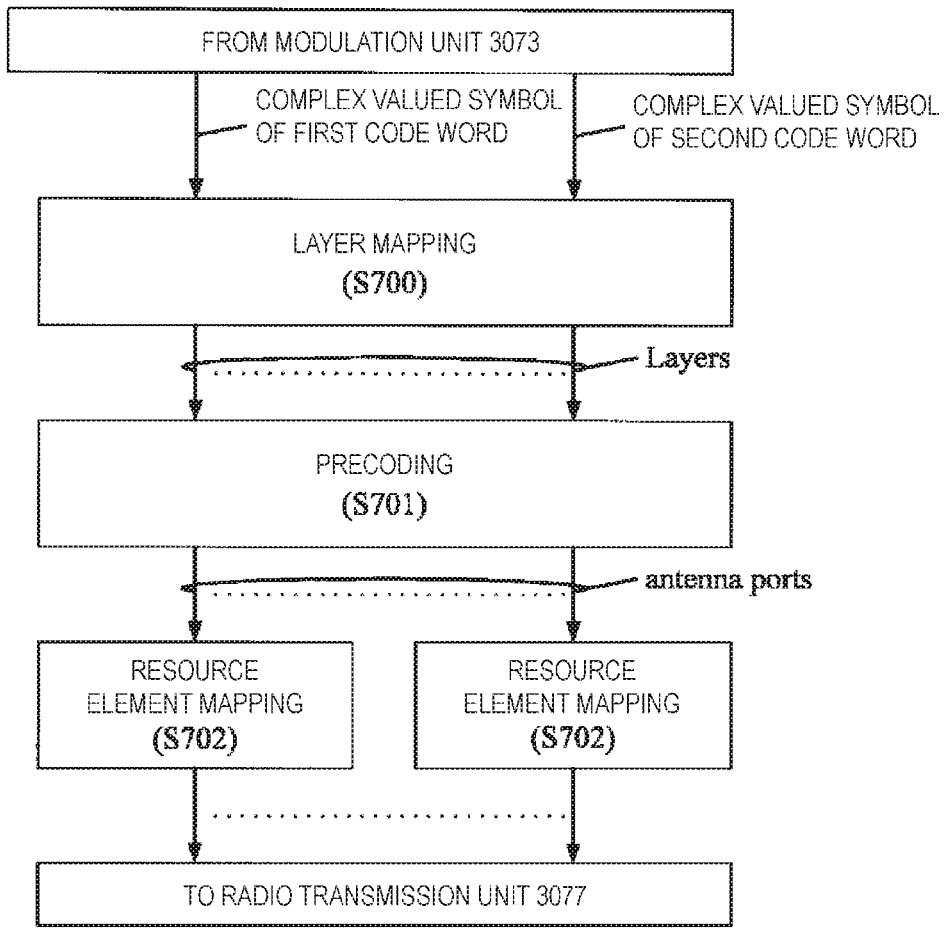
FIG. 7 is a diagram illustrating one example of processing in a multiplexing unit 3075 according to the present embodiment.

FIG. 7 is a diagram illustrating one example of processing in the multiplexing unit 3075 according to the present embodiment. The multiplexing unit 3075 maps a complex valued symbol of a first code word and a complex valued symbol of a second code word input from the modulation unit 3073 to one or more layers (S700). Note that only the complex valued symbol of the first code word may be input from the modulation unit 3073. Note that the number of code words to be input is equal to or less than the number of layers.

Precoding is applied to the complex valued symbol mapped to the layers (S701). The sequences of the complex valued symbols equal in number to the number of corresponding transmit antenna ports are generated by the precoding. Note that the number of the layers is equal to or less than the number of the transmit antenna ports corresponding to the transmission of the PDSCH. The complex valued symbol to which the precoding is applied is mapped to a resource element for each transmit antenna port corresponding to the transmission of the PDSCH (S702).

The terminal device 1 configures a transmission mode for the PDSCH transmission, based on information received from the base station device 3. The terminal device 1 is configured, by a higher layer, to receive the PDSCH data transmission signaled through the PDCCH, in accordance with the transmission mode. The terminal device 1 selects a DCI format to be monitored, in accordance with the transmission mode. Furthermore, the terminal device 1 specifies, in accordance with the transmission mode and the received DCI format, the transmission scheme of the PDSCH corresponding to the DCI format.

FIG. 8 is a table showing one example of a correspondence of a transmission mode, a DCI format, and a PDSCH transmission scheme according to the present embodiment. A column P800 in FIG. 8 indicates a transmission mode. A column P801 in FIG. 8 indicates a DCI format. A column P802 in FIG. 8 indicates a transmission scheme of the PDSCH corresponding to the PDCCH and the number of layers supported by the transmission scheme of the PDSCH. For example, in FIG. 8, in a case of the terminal device 1 being configured with a transmission mode 4, and receiving a DCI format 2 on a PDCCH, the transmission scheme of the PDSCH corresponding to the PDCCH is closed-loop spatial multiplexing (up to four layers) or transmit diversity (one layer). Note that information included in the DCI format 2 indicates either one of the closed-loop spatial multiplexing or the transmission diversity. Furthermore, the information included in the DCI format 2 indicates the number of layers to be spatial-multiplexed.

The terminal device 1 transmits, to the base station device 3, capability information (UECapabilityInformation). The base station device 3 configures the terminal device 1 and performs scheduling for the terminal device 1, based on the capability information.

The capability information may include a plurality of capability parameters (UE radio access capability parameters). One capability parameter corresponds to one function or one group of functions. One capability parameter may indicate whether the corresponding function or the corresponding group of functions were tested successfully. One capability parameter may indicate whether the terminal device 1 supports the corresponding function or the corresponding group of functions. The capability information is RRC layer information. The capability parameter is an RRC layer parameter.

The capability information may include one or more capability parameters indicating a UE category. The capability information may include one capability parameter indicating a downlink UE category. In the present embodiment, the downlink UE category is defined separately from the UE category. The UE category and the downlink UE category correspond to the total number of DL-SCH soft channel bits and the maximum number of supported layers for spatial multiplexing in the downlink. The total number of DL-SCH soft channel bits is a total number of soft channel bits capable of being utilized for HARQ processing of the DL-SCH.

FIG. 9 is a table showing one example of a UE category according to the present embodiment. A column P900 of FIG. 9 indicates the capability parameter indicating the UE category. A column P901 of FIG. 9 indicates the UE category indicated by the capability parameter. P902 of FIG. 9 indicates a total number of DL-SCH soft channel bits to which the UE category corresponds. P903 of FIG. 9 indicates the maximum number of supported layers for the spatial multiplexing in the downlink to which the UE category corresponds. The capability parameter ue-Category (without suffix) indicates any one of UE categories 1 to 5. A capability parameter ue-Category-v1020 indicates any one of UE categories 6 to 8. A capability parameter ue-Category-v1170 indicates any one of UE categories 9 and 10. A capability parameter ue-Category-v11a0 indicates any one of UE categories 11 and 12.

FIG. 10 is a table showing one example of a downlink UE category according to the present embodiment. A column P1000 of FIG. 10 indicates a capability parameter indicating the downlink UE category. A column P1001 of FIG. 10 indicates the downlink UE category indicated by the capability parameter. P1002 of FIG. 10 indicates the total number of DL-SCH soft channel bits to which the downlink UE category corresponds. P1003 of FIG. 10 indicates the maximum number of supported layers for the spatial multiplexing in the downlink to which the downlink UE category corresponds. A capability parameter ue-Category DL-r12 indicates any one of downlink UE categories 0, 6, 7, 9, 10, 11, 12, 13, and 14.

FIG. 11 is a table showing one example of a combination of categories indicated by a plurality of capability parameters according to the present embodiment. A case 9 of FIG. 11 expresses, in a case that the capability parameter ue-CategoryDL-r12 indicates a downlink UE category 9, that the capability parameter ue-Category-v1020 indicates the UE category 6 and the capability parameter ue-Category (without suffix) indicates the UE category 4.

The capability information may include the capability parameter supportedBandCombination indicating carrier aggregation and MIMO supported by the terminal device 1. The capability parameter supportedBandCombination indicates one or more band combinations. The one band combination includes one or more bands. The one band includes one or more combinations of a bandwidth class to be supported and MIMO capabilities for the downlink. That is, the terminal device 1 provides, to the base station device 3, for each bandwidth class of each band of each band combination specified in the capability parameter supportedBandCombination, the MIMO capability for the downlink. The MIMO capability for the downlink indicates the maximum number of layers supported by the terminal device 1, and applies to all component carriers (cells) corresponding to the bandwidth class.

The bandwidth class corresponds to an aggregated transmission bandwidth configuration and the maximum number of component carrier which are supported by the terminal device 1 for the bandwidth class. The aggregated transmission bandwidth configuration is defined by the total number of resource blocks included in the component carrier aggregated in the corresponding bands. Note that the plurality of component carriers corresponding to the bandwidth class are contiguous in the frequency region. There may be a guard band of 300 kHz or smaller between the component carriers contiguous in the frequency region.

FIG. 12 is a table showing one example of the bandwidth class according to the present embodiment. In FIG. 12, in a case that the bandwidth class is C, the aggregated transmission bandwidth configuration may be greater than 25, equal to or less than 100, and the maximum number of the component carriers is 2.

Figure 13:
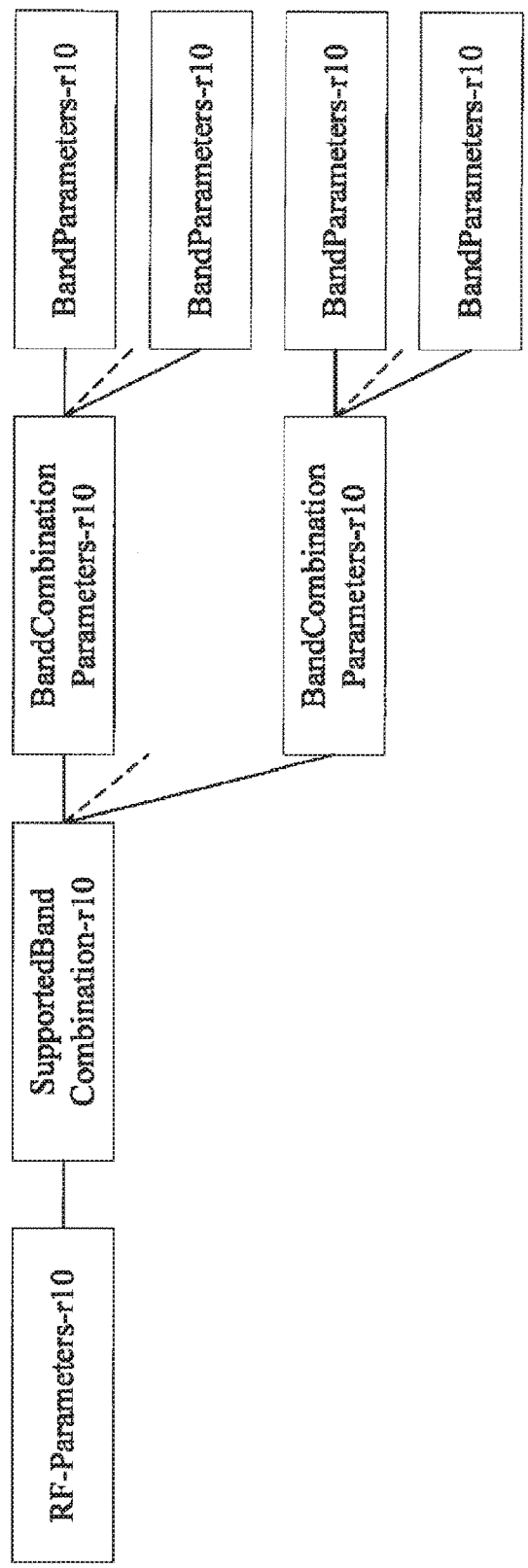
FIG. 13 is a diagram illustrating one example of a configuration of a capability parameter supportedBandCombination according to the present embodiment.
Figure 14:
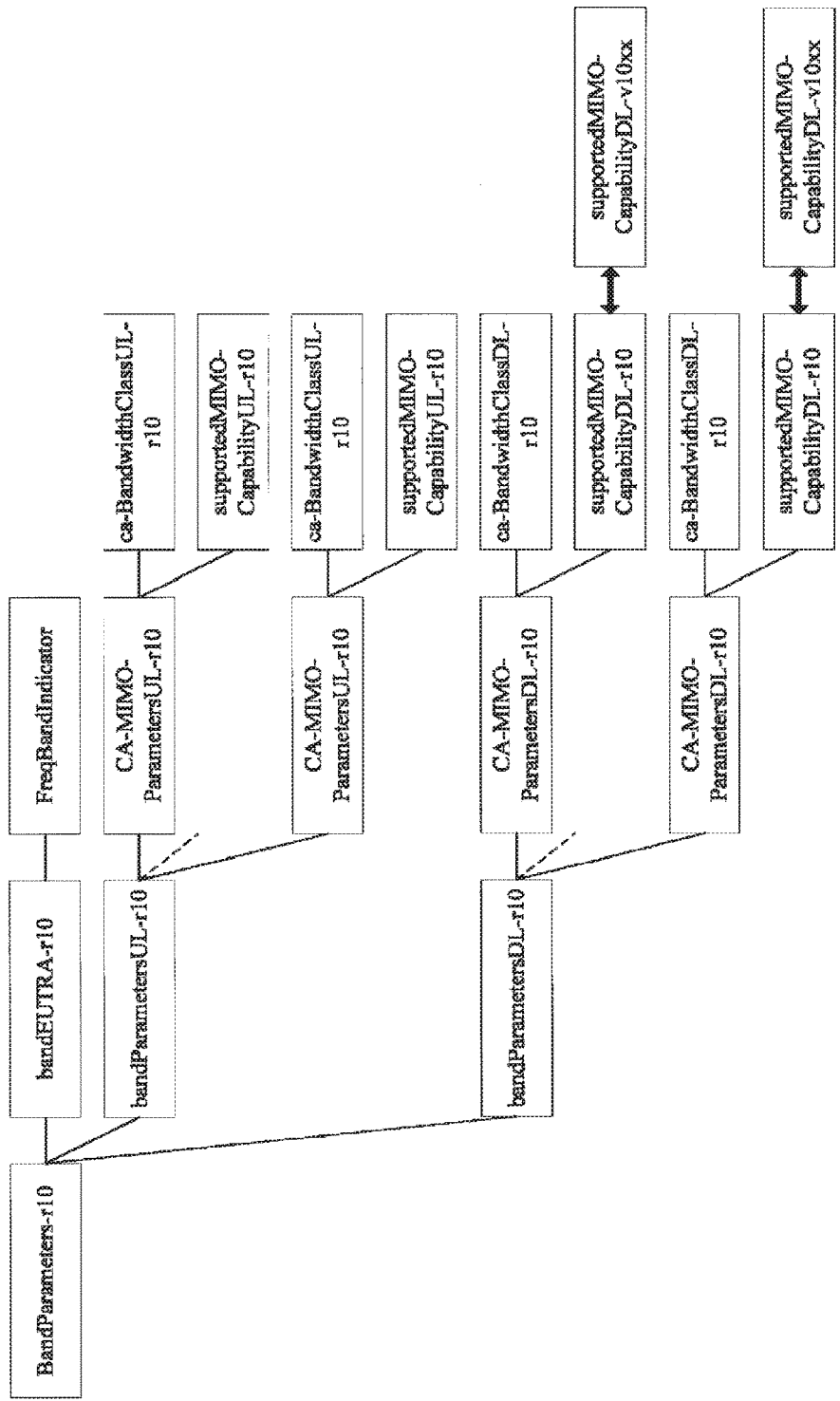
FIG. 14 is a diagram illustrating one example of a configuration of the capability parameter supportedBandCombination according to the present embodiment.

FIG. 13 and FIG. 14 are diagrams illustrating one example of a configuration of the capability parameter supportedBandCombination according to the present embodiment. The capability parameter supportedBandCombination is included in a capability parameter RF-Parameters-r10. The capability parameter supportedBandCombination includes one or more parameters, BandCombinationParameters-r10. The capability parameter supportedBandCombination indicates a band combination. The parameter BandCombinationParameters-r10 includes one or more parameters, BandParameters-r100. The parameter BandParameters-r100 indicates one band.

A parameter FreqBandIndicator included in the parameter BandParameters-r100 indicates a frequency of a corresponding band. A parameter bandParametersUL-r10 included in the parameter BandParameters-r100 includes one or more parameters CA-MIMO-ParametersUL-r10. The parameter CA-MIMO-ParametersUL-r10 includes a parameter ca-BandwidthClassUL-r10 and a parameter supportedMIMO-CapabilityUL-r10. The parameter ca-BandwidthClassUL-r10 indicates a bandwidth class for the uplink in the corresponding band. The parameter supportedMIMO-CapabilityUL-r100 indicates the MIMO capability (the maximum number of layers supported by the terminal device 1) for the uplink in the corresponding band. That is, the parameter ca-BandwidthClassUL-r10 indicates one combination of the bandwidth class and the MIMO capability for the uplink.

A parameter bandParametersDL-r10 included in the parameter BandParameters-r10 includes one or more parameters CA-MIMO-ParametersDL-r10. The parameter CA-MIMO-ParametersDL-r10 includes a parameter ca-BandwidthClassDL-r10 and a parameter supportedMIMO-CapabilityDL-r10. The parameter ca-BandwidthClassDL-r10 indicates the bandwidth class for the downlink in the corresponding band. The parameter supportedMIMO-CapabilityDL-r10 indicates the MIMO capability (the maximum number of layers supported by the terminal device 1) for the downlink in the corresponding band. That is, the parameter ca-BandwidthClassDL-r10 indicates one combination of the bandwidth class and the MIMO capability for the downlink.

The capability parameter supportedBandCombination may indicate the MIMO capability (the maximum number of layers supported by terminal device 1) not involving carrier aggregation.

For each bandwidth class of each band of each band combination specified in the capability parameter supportedBandCombination, the terminal device 1 further indicates the maximum number of layers supported by the terminal device 1, and provides, to the base station device, the MIMO capability (parameter supportedMIMO-CapabilityDL-v10xx) applied to any one of the downlink component carriers corresponding to the bandwidth class. The parameter supportedMIMO-CapabilityDL-v10xx may be included in the capability information, for each bandwidth class of each band of each band combination specified in the capability parameter supportedBandCombination.

That is, for each of the bandwidth class (parameter ca-BandwidthClassDL-r10) of each band of each band combination specified in the capability parameter supportedBandCombination, the terminal device 1 provides, to the base station device 3, the MIMO capability (parameter supportedMIMO-CapabilityDL-r100) for the downlink applied to all downlink component carriers corresponding to the bandwidth class, and the MIMO capability (parameter supportedMIMO-CapabilityDL-v100xx) applied to each of the downlink component carriers corresponding to the bandwidth class. Note that the parameter supportedMIMO-CapabilityDL-v100xx may not be included in the capability parameter supportedBandCombination.

FIG. 15 is a table showing one example of a combination of a bandwidth class and the MIMO capability according to the present embodiment. The terminal device 1 may provide four combinations indicated in FIG. 15 to the base station device 3, for one band in one combination of bands specified in the capability parameter supportedBandCombination. In FIG. 15, in a case that the bandwidth class is B, the parameter supportedMIMO-CapabilityDL-r10 indicates 2, and the parameter supportedMIMO-CapabilityDL-v10xx indicates {4,2}.

In FIG. 15, the base station device 3 that cannot decode the parameter supportedMIMO-CapabilityDL-v10xx determines that the maximum number of layers supported in each of two downlink component carriers (two cells) configured in the corresponding band is 2.

In FIG. 15, the base station device 3 that can decode the parameter supportedMIMO-CapabilityDL-v10xx determines that the maximum number of layers supported in one of the two downlink component carriers (two cells) configured in the corresponding band is 4, and the maximum number of layers supported in the other of the two downlink component carriers is 2.

Hereinafter, in the description of FIG. 15, it is assumed that two downlink component carriers are configured in one band for the terminal device 1. Here, a downlink component carriers out of the two downlink component carriers to which the PDSCH (DL-SCH) transmission involving up to four layers is applied may be controlled by the base station device 3. The base station device 3 may transmit, to the terminal device 1, a parameter LayersCount-v100xx applied to only a first downlink component carrier being one of the two downlink component carriers and indicating the maximum number of layers. The base station device 3 may transmit, to the terminal device 1, a parameter LayersCount-v100xx applied to only a second downlink component carrier being one of the two downlink component carriers and indicating the maximum number of layers. The parameter LayersCount-v100xx is a parameter of the RRC layer.

For example, in FIG. 15, the base station device 3 may transmit, to the terminal device 1, a parameter LayersCount-v10xx that is the parameter LayersCount-v100xx for the first downlink component carrier being one of the two downlink component carriers and indicates 4, and a parameter LayersCount-v10xx that is the parameter LayersCount-v10xx for the second downlink component carrier being one of the two downlink component carriers and indicates 2.

For example, in FIG. 15, in a case that a parameter LayersCount-v10xx for the first downlink component carrier being one of the two downlink component carriers is received/configured, the terminal device 1 may determine that up to four layers indicated by the parameter LayersCount-v10xx are applied to the PDSCH (DL-SCH) transmission in the first downlink component carrier being one of the two downlink component carriers.

For example, in FIG. 15, in a case that the parameter LayersCount-v10xx for the second downlink component carrier being one of the two downlink component carriers is not received/configured, the terminal device 1 may determine that up to two layers indicated by the parameter supportedMIMO-CapabilityDL-r10 are applied to the PDSCH (DL-SCH) transmission in the second downlink component carrier being one of the two downlink component carriers.

For example, in FIG. 15, in a case that the parameter supportedMIMO-CapabilityDL-r10 and the parameter supportedMIMO-CapabilityDL-r100xx are not included in the capability information, the terminal device 1 may determine that up to the maximum number of layers to which the capability parameter ue-Category (without suffix) corresponds are applied to the PDSCH (DL-SCH) transmission in the first downlink component carrier being one of the two downlink component carriers.

Figure 16:
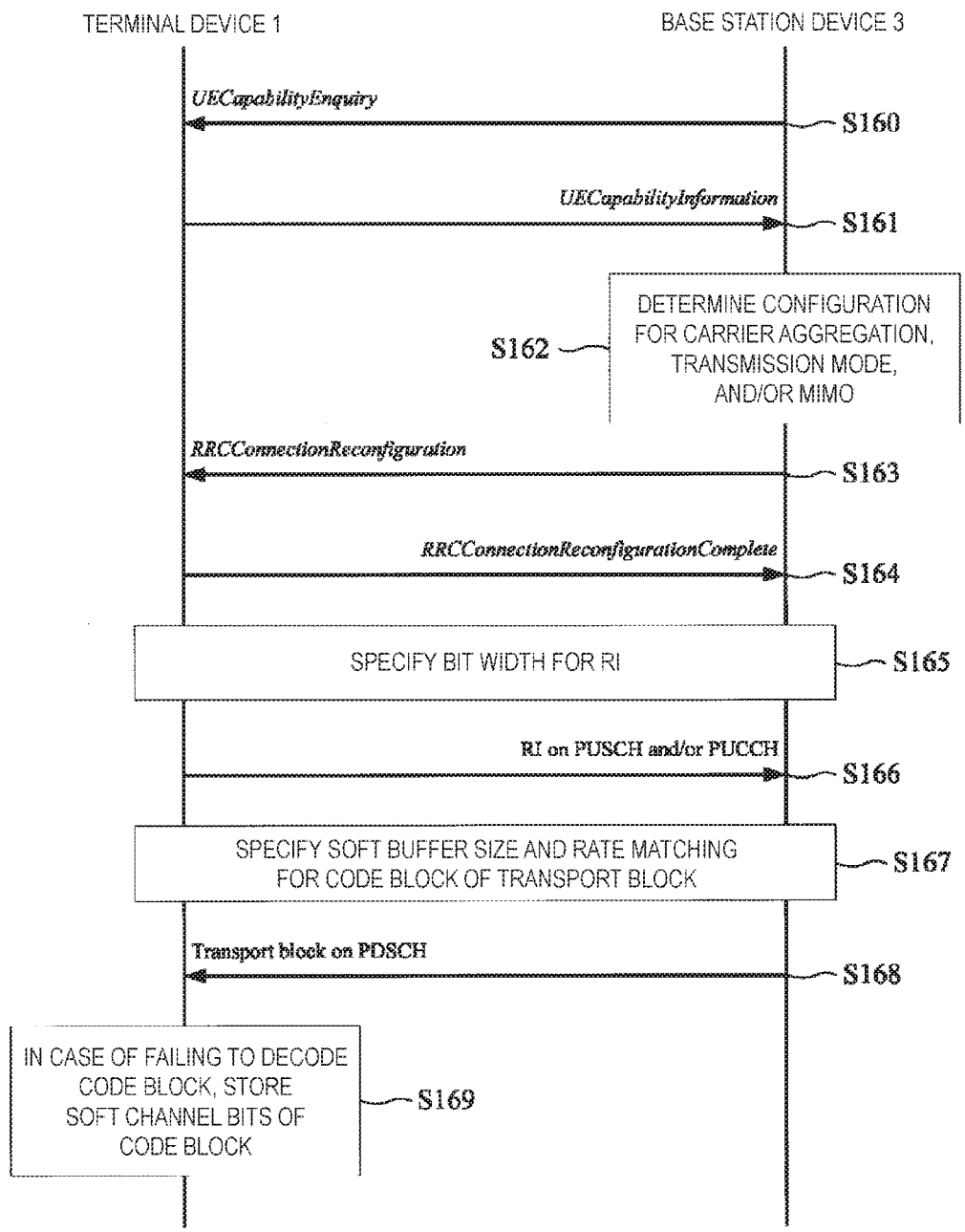
FIG. 16 is a diagram illustrating one example of a sequence chart between the terminal device 1 and the base station device 3 according to the present embodiment.

FIG. 16 is diagram illustrating one example of a sequence chart between the terminal device 1 and the base station device 3 according to the present embodiment.

The base station device 3 transmits a UECapabilityEnquiry message to the terminal device 1 (S160). The UECapabilityEnquiry message is a message of the RRC layer. The UECapabilityEnquiry message is used to request transmission of the capability information (UECapabilityInformation). In a case of receiving the UECapabilityEnquiry message, the terminal device 1 transmits the capability information (UECapabilityInformation) to the base station device 3 (S161).

The base station device 3 determines, in accordance with the received capability information (UECapabilityInformation), the configuration for carrier aggregation, the transmission mode for the PDSCH transmission, and/or the MIMO for the PDSCH transmission, for the terminal device 1 (S162). The base station device 3 transmits an RRCConnectionReconfiguration message to the terminal device 1 (S163). The RRCConnectionReconfiguration message transmits information on the RRC layer for the configuration determined in S161. The RRCConnectionReconfiguration message is a command to correct an RRC connection. The RRCConnectionReconfiguration message may include the parameter LayersCount-v10xx.

The terminal device 1 corrects/reconfigures the RRC connection, in accordance with the received RRCConnectionReconfiguration message. That is, the terminal device 1 corrects/reconfigures carrier aggregation, the transmission mode for the PDSCH transmission, and/or the MIMO for the PDSCH transmission, in accordance with the received RRCConnectionReconfiguration message. After correcting the RRC connection in accordance with the received RRCConnectionReconfiguration message, the terminal device 1 transmits an RRCConnectionReconfigurationComplete message to the base station device 3. The RRCConnectionReconfigurationComplete message is a message of the RRC layer. The RRCConnectionReconfigurationComplete message is used for confirming a successful completion of the RRC connection reconfiguration.

The terminal device 1 and the base station device 3 specify the bit width of an RI, based on the configuration determined in S162 and/or the capability information (UECapabilityInformation) (S165). The terminal device 1 transmits the RI having the bit width determined in S165 on the PUCCH or the PUSCH to the base station device 3. The base station device 3 performs processing of receiving (demultiplexing, demodulating, and/or decoding) the RI, by assuming the RI having the bit width determined in S165.

The bit width of the RI is given for each corresponding downlink component carrier (cell). The bit width of the RI corresponding to a different downlink component carrier may be different from each other. In a case that the maximum number of layers of the downlink (PDSCH) in the corresponding downlink component carrier is 2, the bit width of the RI is "1". In a case that the maximum number of the layers of the downlink (PDSCH) in the corresponding downlink component carrier is 4, the bit width of the RI is "2". In a case that the maximum number of the layers of the downlink (PDSCH) in the corresponding downlink component carrier is 8, the bit width of the RI is "3".

The terminal device 1 and the base station device 3 specify the soft buffer size for the code block of the transport block (code word) transmitted on the PDSCH, and the rate matching for the code block, based on the configuration determined in S162 and/or the capability information (UECapabilityInformation) (S167).

The base station device 3 codes the transport block and transmits the coded transport block to the terminal device 1 on the PDSCH, in accordance with the rate matching for the code block of the transport block specified in S167 (S168). The terminal device 1 performs processing of receiving (decoding) the transport block, in accordance with the rate matching for the code block of the transport block specified in S167.

The terminal device 1 stores, in a case of failing to decode the code block of the transport block, some or all of the soft channel bits of the code block (S169). The soft channel bits of the code block to be stored is given by referring to the soft buffer size for the code block of the transport block specified in S167. The stored soft channel bits are utilized for HARQ processing for the code block. The stored soft channel bits may be combined with the re-transmitted soft channel bits.

Hereinafter, a first example associated with a method of specifying the bit width for the RI in step S165 of FIG. 16 will be described. The first example is applied to the terminal device 1.

(1-1) In the first example, the terminal device 1 includes: a transmission unit 107 configured to transmit a Rank Indicator (RI) determined by a terminal device, the RI corresponding to Physical Downlink Shared CHannel (PDSCH) transmission in a first downlink component carrier corresponding to a first bandwidth class of a first band in a first band combination and corresponding to the number of useful layers; and a reception unit 105 configured to receive the PDSCH. Here, the transmission unit 107 transmits capability information (UECapabilityInformation) including first information (ue-Category (without suffix)), second information (ca-BandwidthClassDL-r10), third information (supportedMIMO-CapabilityDL-r10), and/or fourth information (supportedMIMO-CapabilityDL-v10xx). Here, the reception unit 105 receives fifth information (LayersCount-v10xx) for the first downlink component carrier corresponding to the first bandwidth class of the first band in the first band combination. Here, the first information (ue-Category (without suffix)) indicates a UE category corresponding to a first maximum number of the layers supported by the terminal device in the downlink. Here, the second information (ca-BandwidthClassDL-r10) indicates the first bandwidth class that is for the first band in the first band combination and corresponds to the number of downlink component carriers supported by the terminal device. Here, the third information (supportedMIMO-CapabilityDL-r10) is applied to all of one or more downlink component carriers corresponding to the first bandwidth class of the first band in the first band combination, and indicates a second maximum number of the layers supported by the terminal device in the downlink. Here, the fourth information (supportedMIMO-CapabilityDL-v10xx) is applied to any one of the one or more downlink component carriers corresponding to the first bandwidth class of the first band in the first band combination, and indicates a third maximum number of the layers supported by the terminal device in the downlink. Here, the fifth information (LayersCount-v10xx) indicates a fourth maximum number of the layers. Here, a fifth maximum number of the layers assumed for determining a bit width for the RI is given, based on whether the fifth information for the first downlink component carrier corresponding to the first bandwidth class of the first band in the first band combination is configured, by referring to any one of the first maximum number of the layers corresponding to the first information, the second maximum number of the layers indicated by the third information, and the fourth maximum number of the layers indicated by the fifth information. Here, the bit width for the RI is given by referring to the fifth maximum number of the layers.

(1-2) In the first example, in a case that the fifth information (LayersCount-v10xx) for the first downlink component carrier corresponding to the first bandwidth class of the first band in the first band combination is not configured, the fifth maximum number of the layers assumed for determining the bit width for the RI is given by referring to any one of the first maximum number of the layers and the second maximum number of the layers. Here, in a case that the fifth information (LayersCount-v10xx) for the first downlink component carrier corresponding to the first bandwidth class of the first band in the first band combination is configured, the fifth maximum number of the layers assumed for determining the bit width for the RI is given by referring to the fourth maximum number of the layers.

(1-3) In the first example, in a case that: the fifth information (LayersCount-v10xx) for the first downlink component carrier corresponding to the first bandwidth class of the first band in the first band combination is configured; and a first transmission mode (for example, a transmission mode 9) for the PDSCH transmission for the first downlink component carrier is configured, the fifth maximum number of the layers assumed for determining the bit width for the RI is determined in accordance with a smallest of (i) the number of configured first ports and (ii) the third maximum number of the layers. Here, the first port is a transmit antenna port for a Chanel State Information-Reference Signal (CSI-RS).

(1-4) In the first example, in a case that: the fifth information (LayersCount-v10xx) for the first downlink component carrier corresponding to the first bandwidth class of the first band in the first band combination is configured; and a second transmission mode (for example, a transmission mode 4) for the PDSCH transmission for the first downlink component carrier is configured, the fifth maximum number of the layers assumed for determining the bit width for the RI is determined in accordance with a smallest of (i) the number of second ports and (ii) the third maximum number of the layers. Here, the second port is a transmit antenna port for the Physical Broadcast CHannel (PBCH). That is, in the case that: the fifth information for the first downlink component carrier corresponding to the first bandwidth class of the first band in the first band combination is configured; and the second transmission mode for the PDSCH transmission is configured for the first downlink component carrier, the fifth maximum number of the layers assumed for determining the bit width for the RI is determined in accordance with at least the third maximum number of the layers indicated by the fifth information.

(1-5) In the first example, in a case that: the fifth information (LayersCount-v10xx) for the first downlink component carrier corresponding to the first bandwidth class of the first band in the first band combination is not configured; the first transmission mode (for example, the transmission mode 9) for the PDSCH transmission for the first downlink component carrier is configured; and the third information (supportedMIMO-CapabilityDL-r100) is included in the capability information (UECapabilityInformation), the fifth maximum number of the layers assumed for determining the bit width for the RI is determined in accordance with a smallest of (i) the number of configured first ports and (ii) the second maximum number of the layers indicated by the third information. Here, the first port is a transmit antenna port for a Chanel State Information-Reference Signal (CSI-RS).

(1-6) In the first example, in a case that: the fifth information (LayersCount-v10xx) for the first downlink component carrier corresponding to the first bandwidth class of the first band in the first band combination is not configured; the first transmission mode (for example, the transmission mode 9) for the PDSCH transmission for the first downlink component carrier is configured; and the third information (supportedMIMO-CapabilityDL-r100) is not included in the capability information (UECapabilityInformation), the fifth maximum number of the layers assumed for determining the bit width for the RI is determined in accordance with a smallest of (i) the number of configured first ports and (ii) the first maximum number of the layers corresponding to the first information. Here, the first port is a transmit antenna port for a Chanel State Information-Reference Signal (CSI-RS).

(1-7) In the first example, in a case that: the fifth information (LayersCount-v10xx) for the first downlink component carrier corresponding to the first bandwidth class of the first band in the first band combination is not configured; and the second transmission mode (for example, the transmission mode 4) for the PDSCH transmission for the first downlink component carrier is configured, the fifth maximum number of the layers assumed for determining the bit width for the RI is determined in accordance with a smallest of (i) the number of second ports and (ii) the first maximum number of the layers corresponding to the first information. Here, the second port is a transmit antenna port for the Physical Broadcast CHannel (PBCH).

(1-8) In the first example, the transmission unit 107 transmits the RI on a Physical Uplink Shared CHannel (PUSCH).

Hereinafter, a second example associated with the method of specifying the bit width for the RI in step S165 of FIG. 16 will be described. The second example is applied to the base station device 3.

(2-1) In the second example, the base station device 3 includes: a reception unit 305 configured to receive, from a terminal device, a Rank Indicator (RI) determined by the terminal device, the RI corresponding to Physical Downlink Shared CHannel (PDSCH) transmission in a first downlink component carrier corresponding to a first bandwidth class of a first band in a first band combination and corresponding to the number of useful layers; and a transmission unit 307 configured to transmit the PDSCH to the terminal device. Here, the reception unit 305 receives, from the terminal device, capability information (UECapabilityInformation) including first information (ue-Category (without suffix)), second information (ca-BandwidthClassDL-r10), third information (supportedMIMO-CapabilityDL-r10), and/or fourth information (supportedMIMO-CapabilityDL-v10xx). Here, the transmission unit 307 transmits, to the terminal device, fifth information (LayersCount-v10xx) for the first downlink component carrier corresponding to the first bandwidth class of the first band in the first band combination.

Here, the first information (ue-Category (without suffix)) indicates a UE category corresponding to a first maximum number of the layers supported by the terminal device in the downlink. Here, the second information (ca-BandwidthClassDL-r10) indicates the first bandwidth class that is for the first band in the first band combination and corresponds to the number of downlink component carriers supported by the terminal device. Here, the third information (supportedMIMO-CapabilityDL-r10) is applied to all of one or more downlink component carriers corresponding to the first bandwidth class of the first band in the first band combination, and indicates a second maximum number of the layers supported by the terminal device in the downlink. Here, the fourth information (supportedMIMO-CapabilityDL-v10xx) is applied to any one of the one or more downlink component carriers corresponding to the first bandwidth class of the first band in the first band combination, and indicates a third maximum number of the layers supported by the terminal device in the downlink. Here, the fifth information (LayersCount-v10xx) indicates a fourth maximum number of the layers. A fifth maximum number of the layers assumed for determining a bit width for the RI is given, based on whether the fifth information (LayersCount-v10xx) for the first downlink component carrier corresponding to the first bandwidth class of the first band in the first band combination is configured for the terminal device, by referring to any one of the first maximum number of the layers corresponding to the first information, the second maximum number of the layers indicated by the third information, and the fourth maximum number of the layers indicated by the fifth information.

(2-2) In the second example, in a case that the fifth information (LayersCount-v10xx) for the first downlink component carrier corresponding to the first bandwidth class of the first band in the first band combination is not configured for the terminal device, the fifth maximum number of the layers assumed for determining the bit width for the RI is given by referring to any one of the first maximum number of the layers and the second maximum number of the layers. Here, in a case that the fifth information (LayersCount-v10xx) for the first downlink component carrier corresponding to the first bandwidth class of the first band in the first band combination is configured for the terminal device, the fifth maximum number of the layers assumed for determining the bit width for the RI is given by referring to the fourth maximum number of the layers.

(2-3) In the second example, in a case that: the fifth information (LayersCount-v10xx) for the first downlink component carrier corresponding to the first bandwidth class of the first band in the first band combination is configured for the terminal device; and a first transmission mode (for example, a transmission mode 9) for the PDSCH transmission for the first downlink component carrier is configured for the terminal device, the fifth maximum number of the layers assumed for determining the bit width for the RI is determined in accordance with a smallest of (i) the number of configured first ports and (ii) the third maximum number of the layers, here, the first port is a transmit antenna port for a Chanel State Information-Reference Signal (CSI-RS).

(2-4) In the second example, in a case that: the fifth information (LayersCount-v10xx) for the first downlink component carrier corresponding to the first bandwidth class of the first band in the first band combination is configured for the terminal device; and a second transmission mode (for example, a transmission mode 4) for the PDSCH transmission for the first downlink component carrier is configured for the terminal device, the fifth maximum number of the layers assumed for determining the bit width for the RI is determined in accordance with a smallest of (i) the number of second ports and (ii) the third maximum number of the layers. Here, the second port is a transmit antenna port for the Physical Broadcast CHannel (PBCH). That is, in a case that: the fifth information for the first downlink component carrier corresponding to the first bandwidth class of the first band in the first band combination is configured; and the second transmission mode for the PDSCH transmission is configured for the first downlink component carrier, the fifth maximum number of the layers assumed for determining the bit width for the RI is determined in accordance with at least the third maximum number of the layers indicated by the fifth information.

(2-5) In the second example, in a case that: the fifth information (LayersCount-v10xx) for the first downlink component carrier corresponding to the first bandwidth class of the first band in the first band combination is not configured for the terminal device; the first transmission mode (for example, the transmission mode 9) for the PDSCH transmission for the first downlink component carrier is configured for the terminal device; and the third information (supportedMIMO-CapabilityDL-r10) is included in the capability information (UECapabilityInformation), the fifth maximum number of the layers assumed for determining the bit width for the RI is determined in accordance with a smallest of (i) the number of configured first ports and (ii) the second maximum number of the layers indicated by the third information. Here, the first port is a transmit antenna port for a Chanel State Information-Reference Signal (CSI-RS).

(2-6) In the second example, in a case that: the fifth information (LayersCount-v10xx) for the first downlink component carrier corresponding to the first bandwidth class of the first band in the first band combination is not configured for the terminal device; the first transmission mode (for example, the transmission mode 9) for the PDSCH transmission for the first downlink component carrier is configured for the terminal device; and the third information (supportedMIMO-CapabilityDL-r100) is not included in the capability information (UECapabilityInformation), the fifth maximum number of the layers assumed for determining the bit width for the RI is determined in accordance with a smallest of (i) the number of configured first ports and (ii) the first maximum number of the layers corresponding to the first information. Here, the first port is a transmit antenna port for a Chanel State Information-Reference Signal (CSI-RS).

(2-7) In the second example, in a case that: the fifth information (LayersCount-v10xx) for the first downlink component carrier corresponding to the first bandwidth class of the first band in the first band combination is not configured for the terminal device; and the second transmission mode (for example, the transmission mode 4) for the PDSCH transmission for the first downlink component carrier is configured for the terminal device, the fifth maximum number of the layers assumed for determining the bit width for the RI is determined according to a smallest of (i) the number of second ports and (ii) the first maximum number of the layers. Here, the second port is a transmit antenna port for the Physical Broadcast CHannel (PBCH).

(2-8) In the second example, the reception unit 305 receives the RI on the Physical Uplink Shared CHannel (PUSCH).

Hereinafter, a third example associated with the method of specifying the bit width for the RI in step S165 of FIG. 16 will be described. The third example is applied to the terminal device 1. In the third example, the third information (supportedMIMO-CapabilityDL-r10) is included in the capability information (UECapabilityInformation). In the third example, the capability information (UECapabilityInformation) may not need to include the fourth information (supportedMIMO-CapabilityDL-v10xx).

(3-1) In the third example, the terminal device 1 includes: a transmission unit 107 configured to transmit a Rank Indicator (RI) determined by a terminal device, the RI corresponding to Physical Downlink Shared CHannel (PDSCH) transmission in a downlink component carrier corresponding to a first band in a first band combination and corresponding to the number of layers; and a reception unit 105 configured to receive the PDSCH. Here, a first maximum number of the layers assumed for determining a bit width for the RI is based on the number of downlink component carriers configured in the first band in the first band combination.

(3-2) In the third example, the first band combination includes only the first band.

(3-3) In the third example, the terminal device is configured with the transmission mode 9 or 10 for the PDSCH transmission.

(3-4) In the third example, the transmission unit 107 transmits capability information (UECapabilityInformation) including first information (ca-BandwidthClassDL-r10), second information (supportedMIMO-CapabilityDL-r10), third information (ca-BandwidthClassDL-r10), and fourth information (supportedMIMO-CapabilityDL-r10). Here, the first information (ca-BandwidthClassDL-r10) indicates a first bandwidth class that is for the first band in the first band combination and indicates a first number of the downlink component carriers supported by the terminal device. Here, the second information (supportedMIMO-CapabilityDL-r10) is applied to all of the first number of downlink component carriers corresponding to the first band width class of the first band in the first band combination, and indicates the first maximum number of the layers supported by the terminal device in the downlink. Here, the third information (ca-BandwidthClassDL-r10) indicates a second bandwidth class that is for the first band in the first band combination and indicates a second number of the downlink component carriers supported by the terminal device. Here, the fourth information (supportedMIMO-CapabilityDL-r10) is applied to all of the second number of downlink component carriers corresponding to the second bandwidth class of the first band in the first band combination, and indicates the second maximum number of the layers supported by the terminal device in the downlink. Here, the third maximum number of the layers assumed for determining the bit width for the RI is given, based on whether the number of downlink component carriers configured in the first band in the first band combination is either the first number or the second number, by referring to any one of the first maximum number of the layers and the second maximum number of the layers.

(3-5) In the third example, the transmission unit 107 transmits the RI on the Physical Uplink Shared CHannel (PUSCH).

(3-6) In the third example, in a case that the number of downlink component carriers configured in the first band in the first band combination is the first number, the third maximum number of the layers assumed for determining the bit width for the RI is the first maximum number of the layers. Here, in a case that the number of downlink component carriers configured in the first band in the first band combination is the second number, the third maximum number of the layers assumed for determining the bit width for the RI is the second maximum number of the layers.

Hereinafter, a fourth example associated with the method of specifying the bit width for the RI in step S165 of FIG. 16 will be described. The fourth example is applied to the base station device 3. In the fourth example, the third information (supportedMIMO-CapabilityDL-r10) is included in the capability information (UECapabilityInformation). In the fourth example, the capability information (UECapabilityInformation) may not need to include the fourth information (supportedMIMO-CapabilityDL-v10xx).

(4-1) In the fourth example, the base station device 3 includes: a reception unit 305 configured to receive, from a terminal device, a Rank Indicator (RI) determined by the terminal device, the RI corresponding to Physical Downlink Shared CHannel (PDSCH) transmission in a downlink component carrier corresponding to a first band in a first band combination and corresponding to the number of layers; and a transmission unit 307 configured to transmit the PDSCH to the terminal device. Here, a first maximum number of the layers assumed for determining the bit width for the RI is based on the number of downlink component carriers to which the terminal device is configured in the first band in the first band combination.

(4-2) In the fourth example, the first band combination includes only the first band.

(4-3) In the fourth example, the terminal device is configured with the transmission mode 9 or 10 for the PDSCH transmission.

(4-4) In the fourth example, the reception unit 305 receives, from the terminal device, capability information (UECapabilityInformation) including first information (ca-BandwidthClassDL-r10), second information (supportedMIMO-CapabilityDL-r10), third information (ca-BandwidthClassDL-r10), and fourth information (supportedMIMO-CapabilityDL-r10). Here, the first information (ca-BandwidthClassDL-r10) indicates a first bandwidth class that is for the first band in the first band combination and indicates a first number of the downlink component carriers supported by the terminal device. Here, the second information (supportedMIMO-CapabilityDL-r10) is applied to all of the first number of downlink component carriers corresponding to the first band width class of the first band in the first band combination, and indicates the first maximum number of the layers supported by the terminal device in the downlink. Here, the third information (ca-BandwidthClassDL-r10) indicates a second bandwidth class that is for the first band in the first band combination and indicates a second number of the downlink component carriers supported by the terminal device. Here, the fourth information (supportedMIMO-CapabilityDL-r10) is applied to all of the second number of downlink component carriers corresponding to the second bandwidth class of the first band in the first band combination, and indicates the second maximum number of the layers supported by the terminal device in the downlink. Here, the third maximum number of the layers assumed for determining the bit width for the RI is given, based on whether the number of downlink component carriers configured in the first band in the first band combination is either the first number or the second number, by referring to any one of the first maximum number of the layers and the second maximum number of the layers.

(4-5) In the fourth example, the reception unit 305 receives the RI on the Physical Uplink Shared CHannel (PUSCH).

(4-6) In the fourth example, in a case that the number of downlink component carriers configured in the first band in the first band combination is the first number, the third maximum number of the layers assumed for determining the bit width for the RI is the first maximum number of the layers. Here, in a case that the number of downlink component carriers configured in the first band in the first band combination is the second number, the third maximum number of the layers assumed for determining the bit width for the RI is the second maximum number of the layers.

Hereinafter, one example of a method of specifying a rate matching for a code block of a transport block in step S167 of FIG. 16 will be described.

Figure 17:
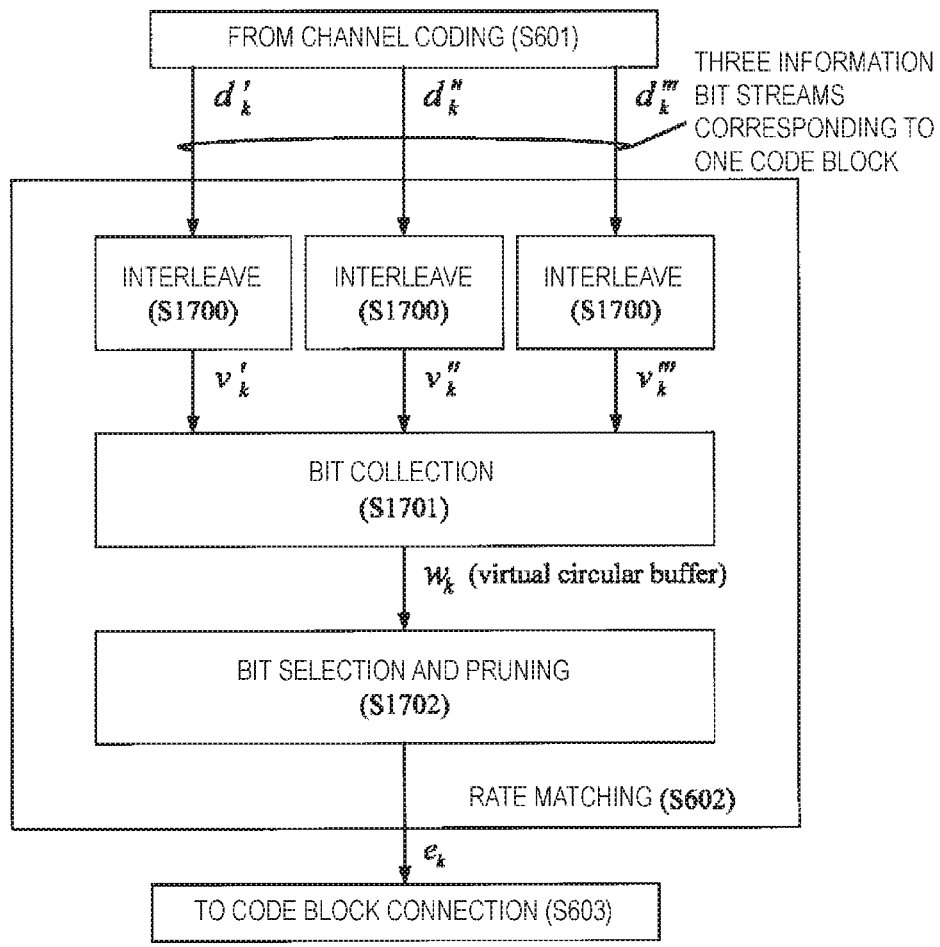
FIG. 17 is a diagram illustrating one example of rate matching according to the present embodiment.

FIG. 17 is a diagram illustrating one example of a rate matching according to the present embodiment. The rate matching is executed in S602 of FIG. 6. That is, the rate matching is applied to a code block of a transport block.

One rate matching (S602) includes three interleaves (S1700), one bit collection (S1701), and one bit selection and pruning (S2002). Three information bit streams ($d'_k$, $d''_k$, $d'''_k$) are input to the one rate matching (S602) from the channel coding (S601). Each of the three information bit streams ($d'_k$, $d''_k$, $d'''_k$) is interleaved in accordance with a sub-block interleaver in the interleaves (S1700). Three output sequences ($v'_k$, $v''_k$, $v'''_k$) are obtained by interleaving each of the three information bit streams ($d'_k$, $d''_k$, $d'''_k$).

A number $C_{subblock}$ of a column of the subframe interleaver is 32. A number $R_{subblock}$ of a row of the sub-block interleaver is a smallest integer satisfying Inequality (1) below, where D is a bit number of each of the information bit streams ($d'_k$, $d''_k$, $d'''_k$).

$$D \leq (R_{subblock} \times C_{subblock}) \qquad [\text{Math. 1}]$$

A bit number $K_\Pi$ of each of the output sequences ($v'_k$, $v''_k$, $v'''_k$) of the subframe interleaver is given by Equation (2) below.

$$K_\Pi = (R_{subblock} \times C_{subblock}) \qquad [\text{Math. 2}]$$

In the bit collection (S2001), $w_k$ (virtual circular buffer) is obtained from three output sequences ($v'_k$, $v''_k$, $v'''_k$). $w_k$ is given Equation (3) below. A bit number Kw of the $w_k$ is three times $K_\Pi$.

$w_k = v'_k$ for $k = 0, \ldots, K_\Pi - 1$ $w_{K_\Pi + 2k} = v''_k$ for $k = 0, \ldots, K_\Pi - 1$ $w_{K_\Pi + 2k+1} = v'''_k$ for $k = 0, \ldots, K_\Pi - 1$ [Math. 3]

In the bit selection and pruning (S1702) of FIG. 17, a rate matching output bit sequence $e_k$ is obtained from $w_k$. A bit number of the rate matching output bit sequence $e_k$ is E. FIG. 18 illustrates one example of the bit selection and pruning according to the present embodiment. $rv_{idx}$ of FIG. 18 is a redundancy version (RV) number for transmission of a corresponding transport block. The RV number is indicated by information included in a DCI format. $N_{cb}$ of FIG. 18 is a soft buffer size for a corresponding code block and is expressed by the bit number. $N_{cb}$ is given by Equation (4) below.

$$N_{cb} = \min\left(\left\lfloor \frac{N_{IR}}{C} \right\rfloor, K_w\right) \qquad [\text{Math. 4}]$$

In the equation, C is the number of code blocks in which one transport block is divided in the code block segmentation (S600) of FIG. 6. In the equation, $N_{IR}$ is a soft buffer size for the corresponding transport block and is expressed by the bit number. $N_{IR}$ is given by Equation (5) below.

$$N_{IR} = \left\lfloor \frac{N_{soft}}{K_C \cdot K_{MIMO} \cdot \min(M_{DL\_HARQ}, M_{limit})} \right\rfloor \qquad [\text{Math. 5}]$$

In the equation, $K_{MIMO}$ is 2 in a case that the terminal device 1 is configured to receive the PDSCH transmission based on the transmission mode 3, 4, 8, 9, or 10. Otherwise, $K_{MIMO}$ is 1. $K_{MIMO}$ is same as the maximum number of transport blocks that can be included by one PDSCH transmission received based on the transmission mode with which the terminal device 1 is configured.

In the equation, $M_{DL\_HARQ}$ is a maximum number of downlink HARQ processes managed concurrently in one corresponding serving cell. $M_{DL\_HARQ}$ may be 8 for an FDD serving cell. For a TDD serving cell, $M_{DL\_HARQ}$ may correspond to the uplink-downlink configuration. In the equation, $M_{limit}$ is 8.

In the equation, $K_c$ is any one of 1, 3/2, 2, 3, and 5. A method of configuring $K_c$ will be described after a method of configuring $N_{soft}$.

In the equation, $N_{soft}$ is a total number of a UE category or a total number of soft channel bits in accordance with a downlink UE category. $N_{soft}$ is given by any one of the capability parameter ue-Category (without suffix), the capability parameter ue-Category-v1020, the capability parameter ue-Category-v1170, and the capability parameter ue-CategoryDL-r12.

$N_{soft}$ may be specified based on (i) which one of the capability parameter ue-Category (without suffix), the capability parameter ue-Category-v1020, the capability parameter ue-Category-v1170, and the capability parameter ue-CategoryDL-r12 is transmitted, (ii) whether a parameter LayersCount-v10xx is received/configured, and/or (iii) whether a parameter altCQI-Table-r12 is received/configured.

In a case that the parameter altCQI-Table-r12 is not configured for the terminal device 1, the terminal device 1 derives a CQI, based on a first table indicating an association of a CQI with a combination of a modulation scheme and a coding rate for a single transport block transmitted on the PDSCH. In a case that the parameter altCQI-Table-r12 is configured for the terminal device 1, the terminal device 1 derives a CQI, based on a second table indicating an association of a CQI with a combination of a modulation scheme and a coding rate for a single transport block transmitted on the PDSCH. The first table may be a table designed assuming that a 256 QAM is not applied to the PDSCH. The second table may be a table designed assuming that the 256 QAM is applied to the PDSCH.

Figure 19:
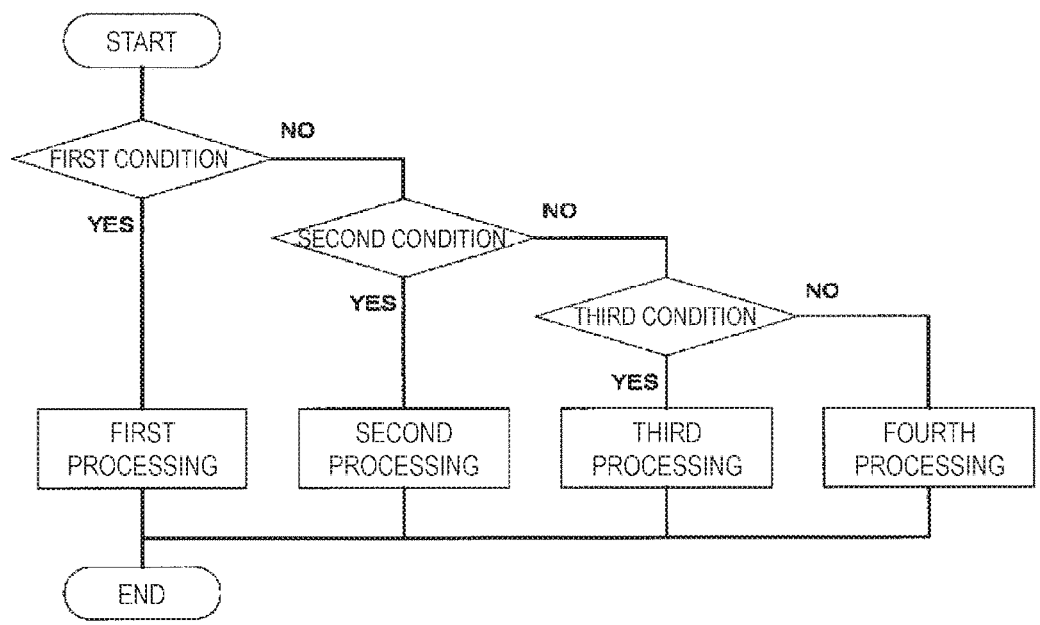
FIG. 19 is a diagram illustrating one example of a flow chart associated with a determination of a total number $N_{soft}$ of soft channel bits according to the present embodiment.

FIG. 19 is a diagram illustrating one example of a flow chart associated with a determination of the total number $N_{soft}$ of the soft channel bits according to the present embodiment. The flow of FIG. 19 may be applied to each of the downlink component carriers (cells). In a case of satisfying a first condition, first processing is performed. In a case of not satisfying the first condition, the flow proceeds to a second condition. In a case of satisfying the second condition, second processing is performed. In a case of not satisfying the second condition, the flow proceeds to a third condition. In a case of satisfying the third condition, third processing is performed. In a case of not satisfying the third condition, fourth processing is performed. After performing the first processing, the second processing, the third processing, or the fourth processing, the flow associated with the determination of the total number $N_{soft}$ of the soft channel bits is ended.

In the first condition of FIG. 19, (i) in a case where the terminal device 1 signals the capability parameter ue-CategoryDL-r12 indicating the downlink UE category 0, or (ii) in a case where the terminal device 1 signals the capability parameter ue-CategoryDL-r12 not indicating the downlink UE category 0 and the terminal device 1 is configured with the parameter altCQI-Table-r12 for the downlink component carrier (cell) by the higher layer (YES), $N_{soft}$ is the total number of the soft channel bits in accordance with the downlink UE category indicated by the capability parameter ue-CategoryDL-r12 (first processing).

In the second condition of FIG. 19, in a case where the terminal device 1 signals the capability parameter ue-Category-v11a0 and in a case where the terminal device 1 is configured with the parameter altCQI-Table-r12 for the downlink component carrier (cell) by the higher layer (YES), $N_{soft}$ is the total number of the soft channel bits in accordance with the UE category indicated by the capability parameter ue-Category0v11a0 (second processing).

In the third condition of FIG. 19, in a case where the terminal device 1 signals the capability parameter ue-Category-v1020 and in a case where the terminal device 1 is configured with the first transmission mode (for example, the transmission mode 9 or the transmission mode 10) for the downlink component carrier (cell) (YES), $N_{soft}$ is the total number of the soft channel bits in accordance with the UE category indicated by the capability parameter ue-Category-v1020 (third processing). Here, the terminal device 1 may or may not signal the capability parameter ue-Category-v1170.

In the third condition of FIG. 19, in a case where the terminal device 1 signals the capability parameter ue-Category-v1020 and in a case where the terminal device 1 is configured with the parameter LayersCount-v10xx for the downlink component carrier (cell) by the higher layer (YES), $N_{soft}$ is the total number of the soft channel bits in accordance with the UE category indicated by the capability parameter ue-Category-v1020 (first processing). Here, the terminal device 1 may be configured with a transmission mode other than the first transmission mode. Here, the terminal device 1 may or may not signal the capability parameter ue-Category-v1170.

In a case of not satisfying the first condition, the second condition, and the third condition of FIG. 19, $N_{soft}$ is the total number of the soft channel bits in accordance with the UE category indicated by the capability parameter ue-Category (without suffix) (fourth processing). For example, in a case where the terminal device 1 signals the capability parameter ue-Category-v11a0, the capability parameter ue-Category-v1120, the capability parameter ue-Category-v1020, and the capability parameter ue-Category (without suffix), in a case where the terminal device 1 is not configured with the parameter altCQI-Table-r12 for the downlink component carrier (cell) by the higher layer, in a case where the terminal device 1 is not configured with the parameter LayersCount-v10xx for the downlink component carrier (cell) by the higher layer, and in a case where the terminal device 1 is configured with a transmission mode other than the first transmission mode, $N_{soft}$ is the total number of the soft channel bits in accordance with the UE category indicated by the capability parameter ue-Category (without suffix). Furthermore, for example, in a case where the terminal device 1 signals the capability parameter ue-Category-v1120, the capability parameter ue-Category-v1020, and the capability parameter ue-Category (without suffix), in a case where the terminal device 1 is not configured with the parameter LayersCount-v100xx for the downlink component carrier (cell) by the higher layer, and in a case where the terminal device 1 is configured with a transmission mode other than the first transmission mode, $N_{soft}$ is the total number of the soft channel bits in accordance with the UE category indicated by the capability parameter ue-Category (without suffix).

FIG. 20 illustrates one example of a method of configuring $K_c$ according to the present embodiment. $K_c$ is given based on (i) $N_{soft}$ specified in FIG. 19, (ii) whether the terminal device 1 is configured with the parameter altCQI-Table-r12 for the downlink component carrier (cell) by the higher layer, and/or (iii) the maximum number of layers for the downlink component carrier (cell). Here, the maximum number of layers may be given by referring to (i) the number of layers supported, for the downlink component carrier (cell), by a PDSCH transmission scheme corresponding to the transmission mode with which the terminal device 1 is configured and/or (ii) the maximum number of layers assumed for specifying the bit width for the RI in S165 of FIG. 16. For example, the maximum number of layers may be given in accordance with a smallest of (i) the number of layers supported, for the downlink component carrier (cell), by the PDSCH transmission scheme corresponding to the transmission mode with which the terminal device 1 is configured and (ii) the maximum number of layers assumed for specifying the bit width for the RI in S165 of FIG. 16.

That is, the soft buffer size $N_{cb}$ for the corresponding code block and the rate matching for the corresponding code block may be given by referring to some or all of (i) to (v) below:

(i) which one of the capability parameter ue-Category (without suffix), the capability parameter ue-Category-v1020, the capability parameter ue-Category-v1170, and the capability parameter ue-CategoryDL-r12 is transmitted;

(ii) whether the parameter LayersCount-v10xx for the downlink component carrier is received/configured;

(iii) whether the parameter altCQI-Table-r12 for the downlink component carrier is received/configured;

(iv) the number of layers supported, for the downlink component carrier, by the PDSCH transmission scheme corresponding to the transmission mode with which the terminal device 1 is configured; and (v) the maximum number of layers assumed for specifying the bit width for the RI Hereinafter, a fifth example associated with the method of specifying a rate matching for a code block size of the transport block in step S167 of FIG. 16 will be described. The fifth example is applied to the terminal device 1.

(5-1) In the fifth example, the terminal device 1 includes: a transmission unit 107 configured to transmit a Rank Indicator (RI) for Physical Downlink Shared CHannel (PDSCH) transmission; a reception unit 105 configured to receive first information (an RRCConnectionReconfiguration message) used for determining a first maximum number of layers that is a first maximum number assumed for determining a bit width for the RI and to receive a transport block on the PDSCH, and a decoding unit 1051 configured to decode a code block of the transport block. Here, a rate matching for the code block is based at least on a soft buffer size for the code block. Here, the soft buffer size for the code block is based at least on the first information (RRCConnectionReconfiguration message) used for determining the first maximum number of the layers.

(5-2) In the fifth example, the transmission unit 107 transmits the RI on a Physical Uplink Shared CHannel (PUSCH).

(5-3) In the fifth example, the terminal device 1 is configured with a prescribed transmission mode associated with the PDSCH transmission.

(5-4) In the fifth example, the transmission unit 107 transmits capability information (UECapabilityInformation) including second information (ue-Category (without suffix)) and third information (ue-Category-v1020). Here, the second information (ue-Category (without suffix)) indicates a second maximum number of the layers supported by the terminal device in a downlink, and a first UE category corresponding to a first total number of soft channel bits capable of being utilized for Hybrid Automatic Repeat reQuest (HARQ) processing in the downlink. Here, the third information (ue-Category-v1020) indicates a third maximum number of the layers supported by the terminal device in the downlink, and a second UE category corresponding to a second total number of soft channel bits capable of being utilized for Hybrid Automatic Repeat reQuest (HARQ) processing in the downlink. Here, the soft buffer size for the code block is given by referring to any one of the first total number and the second total number, based on whether the first information (RRCConnectionReconfiguration message) used for determining the first maximum number of the layers indicates a fourth maximum number of the layers. That is, the soft buffer size for the code block is given by referring to any one of the first total number and the second total number, based on whether the first information used for determining the first maximum number of the layers is configured to a value indicating the fourth maximum number of the layers.

(5-5) In the fifth example, in a case that the first information (RRCConnectionReconfiguration message) used for determining the first maximum number of the layers indicates the fourth maximum number of the layers, the soft buffer size for the code block is given by referring to the first total number. Here, in a case that the first information (RRCConnectonReconfiguration message) used for determining the first maximum number of the layers does not indicate the fourth maximum number of the layers, the soft buffer size for the code block is given by referring to the second total number. Here, "the first information (RRCConnectionReconfiguration message) does not indicate the fourth maximum number of the layers" includes "the parameter LayersCount-v100xx is not included in the first information (RRCConnectionReconfiguration message)". That is, in a case that the first information used for determining the first maximum number of the layers is configured to the value indicating the fourth maximum number of the layers, the soft buffer size for the code block is given by referring to the first total number, and in a case that the first information used for determining the first maximum number of the layers is not configured by the value indicating the fourth maximum number of the layers, the soft buffer size for the code block is given by referring to the second total number.

(5-6) In the fifth example, in a case that the first information (RRCConnectionReconfiguration message) used for determining the first maximum number of the layers indicates the fourth maximum number of the layers, the first maximum number of the layers is given by referring to the fourth maximum number of the layers. Here, the "first information (RRCConnectionReconfiguration message) indicates the fourth maximum number of the layers" includes "the parameter LayersCount-v100xx included in the first information (RRCConnectionReconfiguration message) indicates the fourth maximum number of the layers". That is, in a case that the first information is received, the first maximum number of the layers is given by referring to the first information.

(5-7) In the fifth example, in a case that the first information (RRCConnectionReconfiguration message) used for determining the first maximum number of the layers does not indicate the fourth maximum number of the layers, the first maximum number of the layers is given by referring to any one of a plurality of maximum numbers of layers including at least the second maximum number of the layers and the third maximum number of the layers. That is, in a case that the first information is not received, the first maximum number of the layers is given by referring to any one of the second information and the third information.

Hereinafter, a sixth example associated with the method of specifying the rate matching for the code block size of the transport block in step S167 of FIG. 16 will be described. The sixth example is applied to the base station device 3.

(6-1) In the sixth example, the base station device 3 includes: a reception unit 305 configured to receive a Rank Indicator (RI) for Physical Downlink Shared CHannel (PDSCH) transmission from a terminal device; a transmission unit 307 configured to transmit, to the terminal device, first information (RRCConnectionReconfiguration message) used by the terminal device for determining a first maximum number of layers assumed by the terminal device for determining a bit width for the RI and to transmit a transport block to the terminal device on the PDSCH; and a coding unit 3071 configured to code a code block of the transport block. Here, the rate matching for the coded code block is based at least on the soft buffer size for the code block. Here, the soft buffer size for the code block is based at least on first information (an RRCConnectionReconfiguration message) used by the terminal device for determining the first maximum number of the layers.

(6-2) In the sixth example, the reception unit 305 receives the RI from the terminal device on a Physical Uplink Shared CHannel (PUSCH).

(6-3) In the sixth example, the terminal device 1 is configured with a prescribed transmission mode associated with the PDSCH transmission.

(6-4) In the sixth example, the reception unit 305 receives capability information (UECapabilityInformation) including second information (ue-Category (without suffix)) and third information (ue-Category-v1020) from the terminal device. Here, the second information (ue-Category (without suffix)) indicates the second maximum number of the layers supported by the terminal device in a downlink, and a first UE category corresponding to a first total number of soft channel bits capable of being utilized for Hybrid Automatic Repeat reQuest (HARQ) processing in the downlink. Here, the third information (ue-Category-v1020) indicates the third maximum number of the layers supported by the terminal device in the downlink, and a second UE category corresponding to a second total number of soft channel bits capable of being utilized for Hybrid Automatic Repeat reQuest (HARQ) processing in the downlink. Here, the soft buffer size for the code block is given by referring to any one of the first total number and the second total number, based on whether the first information (RRCConnectionReconfiguration message) used by the terminal device for determining the first maximum number of the layers indicates the fourth maximum number of the layers. That is, the soft buffer size for the code block is given by referring to any one of the first total number and the second total number, based on whether the first information used for determining the first maximum number of the layers is configured to a value indicating the fourth maximum number of the layers.

(6-5) In the sixth example, in a case that the first information (RRCConnectionReconfiguration message) used by the terminal device for determining the first maximum number of the layers indicates the fourth maximum number of the layers, the soft buffer size for the code block is given by referring to the first total number. Here, in a case that the first information (RRCConnectionReconfiguration message) used by the terminal device for determining the first maximum number of the layers does not indicate the fourth maximum number of the layers, the soft buffer size for the code block is given by referring to the second total number. That is, in a case that the first information used for determining the first maximum number of the layers is configured to the value indicating the fourth maximum number of the layers, the soft buffer size for the code block is given by referring to the first total number, and in a case that the first information used for determining the first maximum number of the layers is not configured to the value indicating the fourth maximum number of the layers, the soft buffer size for the code block is given by referring to the second total number.

(6-6) In the sixth example, in a case that the first information (RRCConnectonReconfiguration message) used by the terminal device for determining the first maximum number of the layers indicates the fourth maximum number of the layers, the first maximum number of the layers is given by referring to the fourth maximum number of the layers. That is, in a case that the first information is received, the first maximum number of the layers is given by referring to the first information.

(6-7) In the sixth example, in a case that the first information (RRCConnectionReconfiguration message) used by the terminal device for determining the first maximum number of the layers does not indicate the fourth maximum number of the layers, the first maximum number of the layers is given by referring to any one of a plurality of maximum numbers of the layers including at least the second maximum number of the layers and the third maximum number of the layers. That is, in a case that the first information is not received, the first maximum number of the layers is given by referring to any one of the second information and the third information.

In S169 of FIG. 16, soft channel bits of a code block of a transport block stored by the terminal device 1 are based on the soft buffer size $N_{cb}$ for the code block of the transport block. In a case that the terminal device 1 fails to decode the code block of the transport block, the terminal device 1 stores the received soft channel bits at least corresponding to a range of $<w_k, w_{k+1}, \ldots, w_{(k+nSB-1)\ mod\ Ncb}>$. k of $<w_k, w_{k+1}, \ldots, w_{(k+nSB-1)\ mod\ Ncb}>$ is determined by the terminal device 1. Here, in determination of k of $<w_k, w_{k+1}, \ldots, w_{(k+nSB-1) mod\ NcB}>$, it is preferable that the terminal device 1 prioritize storing soft channel bits corresponding to a lower value of k.

Figure 21:
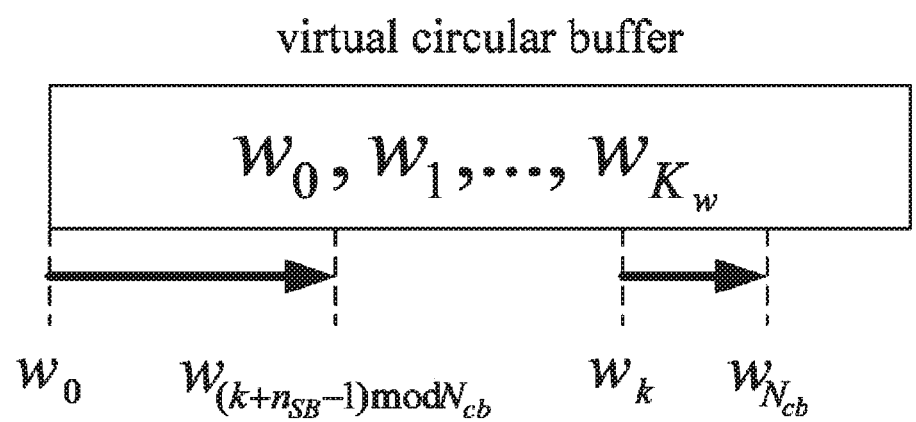
FIG. 21 is a diagram illustrating one example of a range of $<w_k, w_{k+1}, \ldots w_{(k+nSB-1) \mod Ncb}>$ according to the present embodiment.

FIG. 21 is a diagram illustrating one example of a range of $<w_k, w_k+1, \ldots, w_{(k+nSB-1)\ mod\ Ncb}>$ according to the present embodiment. Here, $n_{SB}$ is given by referring to the soft buffer size $N_{cb}$ for a code block of a transport block. $n_{SB}$ is given by Equation (6) below.

$$n_{SB} = \min\left(N_{cb}, \left\lfloor \frac{N'_{soft}}{C \cdot N_{DL\_cells} \cdot K_{MIMO} \cdot \min(M_{DL\_HARQ}, M_{limit})} \right\rfloor \right) \quad \text{[Math. 6]}$$

In the equation, C is defined in Equation (4). In the equation, $K_{MIMO}$, $M_{DL\_HARQ}$, and $M_{limit}$ are defined in Equation 5. In the equation, $N_{DL\_cells}$ is the number of downlink component carriers (cells) configured for the terminal device 1. In the equation, $N'_{soft}$ is the total number of soft channel bits in accordance with the UE category or the downlink UE category. $N'_{soft}$ is given by any one of the capability parameter ue-Category (without suffix), the capability parameter ue-Category-v1020, the capability parameter ue-Category 1170, and the capability parameter ue-CategoryDL-r12. Note that $N_{soft}$ and $N'_{soft}$ are separately defined.

Figure 22:
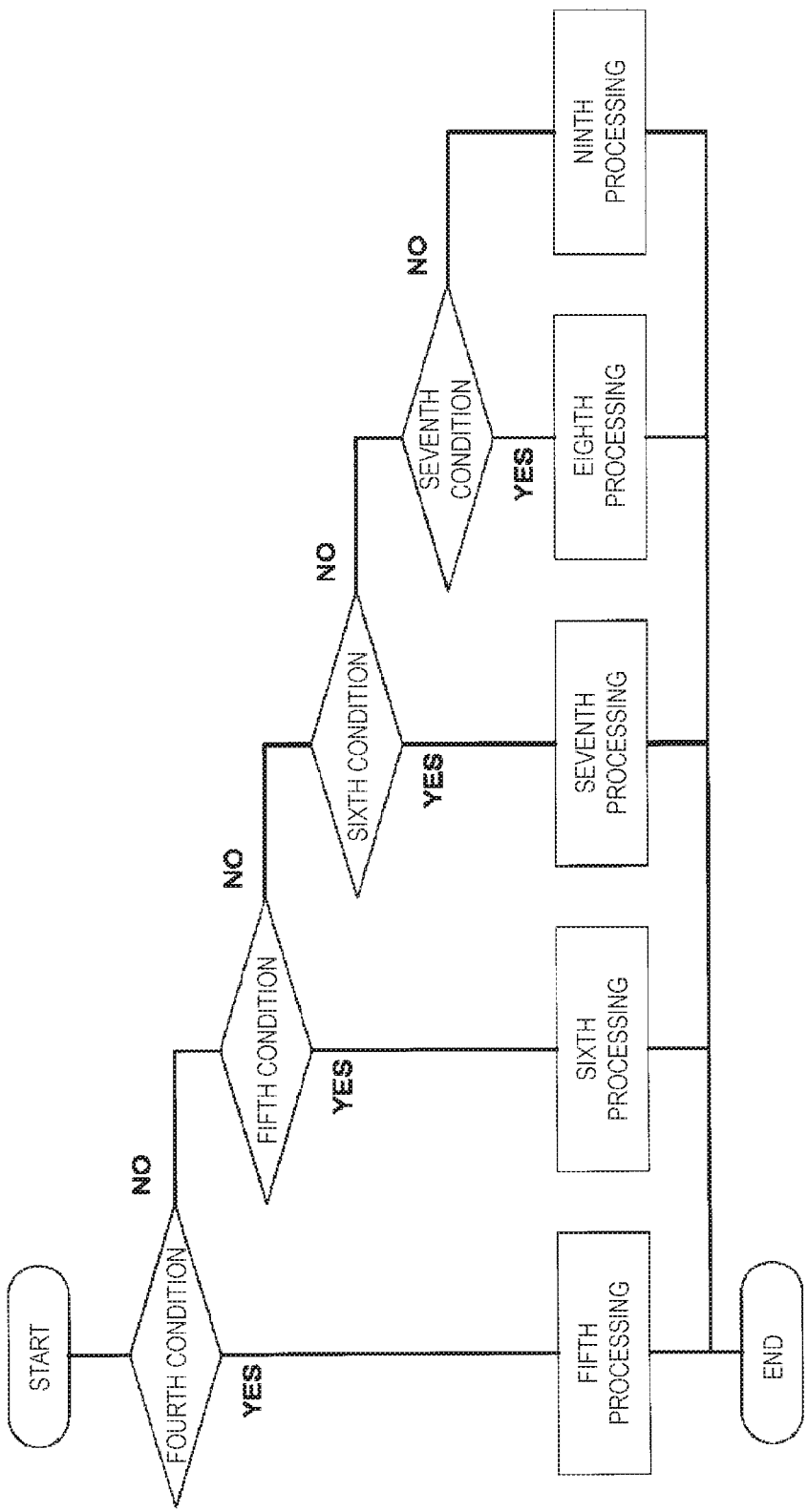
FIG. 22 is a diagram illustrating one example of a flow chart associated with a determination of a total number $N'_{soft}$ of the soft channel bits according to the present embodiment.

FIG. 22 is a diagram illustrating one example of a flow chart associated with a determination of the total number $N'_{soft}$ of the soft channel bits according to the present embodiment. The flow of FIG. 22 may be applied to each of the downlink component carriers (cells). In a case of satisfying a fourth condition, fifth processing is performed. In a case of not satisfying the fourth condition, the flow proceeds to the fifth condition. In a case of satisfying a fifth condition, sixth processing is performed. In a case of not satisfying the fifth condition, the flow proceeds to a sixth condition. In a case of satisfying the sixth condition, seventh processing is performed. In a case of not satisfying the sixth condition, the flow proceeds to a seventh condition. In a case of satisfying the seventh condition, eighth processing is performed. In a case of not satisfying the seventh condition, ninth processing is performed. After performing the fifth processing, the sixth processing, the seventh processing, the eighth processing or the ninth processing, the flow associated with the determination of the total number $N'_{soft}$ of the soft channel bits is ended.

In the fourth condition of FIG. 22, in a case where the terminal device 1 signals the capability parameter ue-CategoryDL-r12 (YES), $N_{soft}$ is the total number of soft channel bits in accordance with the downlink UE category indicated by the capability parameter ue-CategoryDL-r12 (fifth processing).

In the fifth condition of FIG. 22, in a case where the terminal device 1 signals the capability parameter ue-Category-v11a0 and does not signal the capability parameter ue-CategoryDL-r12 (YES), $N_{soft}$ is the total number of soft channel bits in accordance with the UE category indicated by the capability parameter ue-Category-v11a0 (sixth processing).

In the sixth condition of FIG. 22, in a case where the terminal device 1 signals the capability parameter ue-Category-v1170 and does not signal the capability parameter ue-Category-v11a0 and the capability parameter ue-CategoryDL-r12 (YES), $N_{soft}$ is the total number of soft channel bits in accordance with the UE category indicated by the capability parameter ue-Category-v1170 (seventh processing).

In the seventh condition of FIG. 22, in a case where the terminal device 1 signals the capability parameter ue-Category-v1020 and does not signal the capability parameter ue-Category-v1170, the capability parameter ue-Category-v11a0, and the capability parameter ue-CategoryDL-r12 (YES), $N_{soft}$ is the total number of soft channel bits in accordance with the UE category indicated by the capability parameter ue-Category-v1020 (eighth processing).

In the seventh condition of FIG. 22, in a case where the terminal device 1 signals the capability parameter ue-Category (without suffix) and does not signal the capability parameter ue-Category-v1020, the capability parameter ue-Category-v1170, the capability parameter ue-Category-v11a0, and the capability parameter ue-CategoryDL-r12 (NO), $N_{soft}$ is the total number of soft channel bits in accordance with the UE category indicated by the capability parameter ue-Category (without suffix) (ninth processing).

That is, in a case that the terminal device 1 fails to decode a code block of a transport block, soft channel bits to be stored by the terminal device 1 may be given by referring to some or all of (i) to (v) below:

(i) which one of the capability parameter ue-Category (without suffix), the capability parameter ue-Category-v1020, the capability parameter ue-Category-v1170, and the capability parameter ue-CategoryDL-r12 is transmitted;

(ii) whether the parameter LayersCount-v10xx for the downlink component carrier is received/configured;

(iii) whether the parameter altCQI-Table-r12 for the downlink component carrier is received/configured;

(iv) the number of layers supported by a PDSCH transmission scheme corresponding to a transmission mode with which the terminal device 1 is configured for the downlink component carrier; and (v) the maximum number of layers assumed for specifying the bit width for an RI Hereinafter, a seventh example associated with a method of storing the soft channel bits for the code block size of the transport block in step S169 of FIG. 16 will be described. The seventh example is applied to the terminal device 1.

(7-1) In the seventh example, the terminal device 1 includes: a transmission unit 107 configured to transmit a Rank Indicator (RI) for Physical Downlink Shared CHannel (PDSCH) transmission; a reception unit 105 configured to receive first information (an RRCConnectionReconfiguration message) used for determining a first maximum number of layers that is a first maximum assumed for determining a bit width for the RI and to receive a transport block on the PDSCH, and a decoding unit 1051 configured to decode a code block of the transport block. Here, in a case that the decoding unit 1051 fails to decode the code block, the decoding unit 1051 stores at least soft channel bits corresponding to a range of prescribed soft channel bits out of soft channel bits of the code block. Here, the prescribed soft channel bits are based on the soft buffer size for the code block. Here, the soft buffer size for the code block is based at least on the first information (RRCConnectionReconfiguration message) used for determining the first maximum number of the layers.

(7-2) In the seventh example, the transmission unit 107 transmits the RI on the Physical Uplink Shared CHannel (PUSCH).

(7-3) In the seventh example, the terminal device 1 is configured with a first transmission mode for the PDSCH transmission.

(7-4) In the seventh example, the transmission unit 107 transmits capability information (UECapabilityInformation) including second information (ue-Category (without suffix)) and third information (ue-Category-v1020). Here, the second information (ue-Category (without suffix)) indicates the second maximum number of the layers supported by the terminal device in a downlink, and a first UE category corresponding to a first total number of soft channel bits capable of being utilized for Hybrid Automatic Repeat reQuest (HARQ) processing in the downlink. Here, the third information (ue-Category-v1020) indicates the third maximum number of the layers supported by the terminal device in the downlink, and a second UE category corresponding to a second total number of soft channel bits capable of being utilized for Hybrid Automatic Repeat reQuest (HARQ) processing in the downlink. Here, the soft buffer size for the code block is given by referring to any one of the first total number and the second total number, based on whether the first information (RRCConnectionReconfiguration message) used for determining the first maximum number of the layers indicates the fourth maximum number of the layers. That is, the soft buffer size for the code block is given by referring to any one of the first total number and the second total number, based on whether the first information used for determining the first maximum number of the layers is configured to a value indicating the fourth maximum number of the layers.

(7-5) In the seventh example, in a case that the first information (RRCConnectionReconfiguration message) used for determining the first maximum number of the layers indicates the fourth maximum number of the layers, the soft buffer size for the code block is given by referring to the first total number. Here, in a case that the first information (RRCConnectonReconfiguration message) used for determining the first maximum number of the layers does not indicate the fourth maximum number of the layers, the soft buffer size for the code block is given by referring to the second total number. Here, "the first information (RRCConnectionReconfiguration message) does not indicate the fourth maximum number of the layers" includes "the parameter LayersCount-v100xx is not included in the first information (RRCConnectionReconfiguration message)". That is, in a case that the first information used for determining the first maximum number of the layers is configured to the value indicating the fourth maximum number of the layers, the soft buffer size for the code block is given by referring to the first total number, and in a case that the first information used for determining the first maximum number of the layers is not configured to the value indicating the fourth maximum number of the layers, the soft buffer size for the code block is given by referring to the second total number.

(7-6) In the seventh example, in a case that the first information (RRCConnectionReconfiguration message) used for determining the first maximum number of the layers indicates the fourth maximum number of the layers, the first maximum number of the layers is given by referring to the fourth maximum number of the layers. Here, the "first information (RRCConnectionReconfiguration message) indicates the fourth maximum number of the layers" includes "the parameter LayersCount-v10xx included in the first information (RRCConnectionReconfiguration message) indicates the fourth maximum number of the layers". That is, in a case that the first information is received, the first maximum number of the layers is given by referring to the first information.

(7-7) In the seventh example, in a case that the first information (RRCConnectionReconfiguration message) used for determining the first maximum number of the layers does not indicate the fourth maximum number of the layers, the first maximum number of the layers is given by referring to any one of a plurality of maximum numbers of the layers including at least the second maximum number of the layers and the third maximum number of the layers. That is, in a case that the first information is not received, the first maximum number of the layers is given by referring to any one of the second information and the third information.

The present embodiment has been described in detail with references to the first example to the seventh example and FIG. 1 to FIG. 22, but various modifications are possible within the scope indicated in the first example to the seventh example and FIG. 1 to FIG. 22, and the technical means/method that are made by suitably combining technical means/methods disclosed each in the different examples and drawings are also included in the technical scope of the present invention.

Therefore, the terminal device 1 can efficiently communicate with the base station device 3, even in a case where not knowing the release and the version of LTE supported by the base station device 3. Furthermore, the base station device 3 can efficiently communicate with the terminal device 1, even in a case where not knowing the release and the version of LTE supported by the terminal device 1.

A program running on each of the base station device 3 and the terminal device 1 according to the present invention may be a program that controls a Central Processing Unit (CPU) and the like (a program for causing a computer to operate) in such a manner as to realize the functions according to the above-described embodiments of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD) and when necessary, is read by the CPU to be modified or rewritten.

Moreover, the terminal device 1 and the base station device 3 according to the above-described embodiments may be partially realized by a computer. This configuration may be realized by recording a program for realizing such control functions on a computer-readable medium and causing a computer system to read the program recorded on the recording medium for execution.

The "computer system" refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiments can be realized as an aggregation (a device group) constituted of multiple devices. Devices constituting the device group may be each equipped with some or all portions of each function or each functional block of the base station device 3 according to the above-described embodiments. It is only required that the device group itself include general functions or general functional blocks of the base station device 3. Furthermore, the terminal device 1 according to the above-described embodiments can also communicate with the base station device as the aggregation.

Furthermore, the base station device 3 according to the above-described embodiments may be an Evolved Universal Terrestrial Radio Access Network (EUTRAN). Furthermore, the base station device 3 according to the above-described embodiments may have some or all portions of the function of a node higher than an eNodeB.

Furthermore, some or all portions of each of the terminal device 1 and the base station device 3 according to the above-described embodiments may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, the circuit integration technique is not limited to the LSI, and the integrated circuit may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal device is described as one example of a terminal device or a communication device, but the present invention is not limited to this, and can be applied to a fixed-type or a stationary-type electronic apparatus installed indoors or outdoors, for example, a terminal device or a communication device, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

INDUSTRIAL APPLICABILITY

The present invention can be applied to terminal devices or communication devices such as a mobile phone, a personal computer, a tablet computer, an audio-video (AV) apparatus, a kitchen apparatus, a cleaning or washing machine, an air-conditioning apparatus, office equipment, a vending machine, and other household apparatuses.

DESCRIPTION OF REFERENCE NUMERALS 1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 CSI report control unit
3011 Radio resource control unit
3013 Scheduling unit
3015 CSI report control unit

The invention claimed is:

1. A terminal device, comprising:
transmission circuitry configured to transmit a Rank Indicator (RI) determined by the terminal device, the RI corresponding to a number of useful layers and corresponding to Physical Downlink Shared CHannel (PDSCH) transmission in a first downlink component carrier corresponding to a first bandwidth class of a first band in a first band combination; and
reception circuitry configured to receive the PDSCH,
wherein the transmission circuitry is configured to transmit capability information including first information, second information, and/or third information,
the reception circuitry is configured to receive fifth information for the first downlink component carrier corresponding to the first bandwidth class of the first band in the first band combination,
the first information indicates a UE category corresponding to a first maximum number of the layers supported by the terminal device in a downlink,
the second information indicates the first bandwidth class being for the first band in the first band combination and corresponding to a number of downlink component carriers supported by the terminal device,
the third information is applied to all of one or more downlink component carriers corresponding to the first bandwidth class of the first band in the first band combination, and indicates a second maximum number of the layers supported by the terminal device in the downlink,
the fifth information indicates a fourth maximum number of the layers,
in a case that the fifth information for the first downlink component carrier corresponding to the first bandwidth class of the first band in the first band combination is not configured, a fifth maximum number of the layers assumed for determining a bit width for the RI is given by referring to any one of the first information and the third information, and
in a case that the fifth information for the first downlink component carrier corresponding to the first bandwidth class of the first band in the first band combination is configured, the fifth maximum number of the layers assumed for determining the bit width for the RI is given by referring to the fifth information.

2. The terminal device according to claim 1, wherein
in a case that the fifth information for the first downlink component carrier corresponding to the first bandwidth class of the first band in the first band combination is configured, and a second transmission mode for the PDSCH transmission is configured for the first downlink component carrier,
the fifth maximum number of the layers assumed for determining the bit width for the RI is determined according to at least a third maximum number of the layers indicated by the fifth information.

3. The terminal device according to claim 1, wherein
in a case that the fifth information for the first downlink component carrier corresponding to the first bandwidth class of the first band in the first band combination is not configured, a first transmission mode for the PDSCH transmission is configured for the first downlink component carrier, and the third information is included in the capability information,
the fifth maximum number of the layers assumed for determining the bit width for the RI is determined according to a minimum of (i) a configured number of first ports and (ii) the second maximum number of the layers indicated by the third information, and
the first port is a transmit antenna port for a Chanel State Information-Reference Signal (CSI-RS).

4. The terminal device according to claim 1, wherein
in a case that the fifth information for the first downlink component carrier corresponding to the first bandwidth class of the first band in the first band combination is not configured, a first transmission mode for the PDSCH transmission is configured for the first downlink component carrier, and the third information is not included in the capability information,
the fifth maximum number of the layers assumed for determining the bit width for the RI is determined according to a minimum of (i) a configured number of first ports and (ii) the first maximum number of the layers corresponding to the first information, and
the first port is a transmit antenna port for a Chanel State Information-Reference Signal (CSI-RS).

5. The terminal device according to claim 1, wherein
in a case that the fifth information for the first downlink component carrier corresponding to the first bandwidth class of the first band in the first band combination is not configured, and a second transmission mode for the PDSCH transmission is configured for the first downlink component carrier,
the fifth maximum number of the layers assumed for determining the bit width for the RI is determined according to a minimum of (i) a number of second ports and (ii) the first maximum number of the layers corresponding to the first information, and
the second port is a transmit antenna port for a Physical Broadcast CHannel (PBCH).

6. The terminal device according to claim 1, wherein the transmission circuitry is configured to transmit the RI on a Physical Uplink Shared CHannel (PUSCH).

7. A base station device, comprising:
reception circuitry configured to receive, from a terminal device, a Rank Indicator (RI) determined by the terminal device, the RI corresponding to a number of useful layers and corresponding to Physical Downlink Shared CHannel (PDSCH) transmission in a first downlink component carrier corresponding to a first bandwidth class of a first band in a first band combination; and
transmission circuitry configured to transmit the PDSCH to the terminal device,
wherein the reception circuitry is configured to receive, from the terminal device, capability information including first information, second information, and/or third information,
the transmission circuitry is configured to transmit, to the terminal device, fifth information for the first downlink component carrier corresponding to the first bandwidth class of the first band in the first band combination,
the first information indicates a UE category corresponding to a first maximum number of the layers supported by the terminal device in a downlink,
the second information indicates the first bandwidth class being for the first band in the first band combination and corresponding to a number of downlink component carriers supported by the terminal device,
the third information is applied to all of one or more downlink component carriers corresponding to the first bandwidth class of the first band in the first band combination, and indicates a second maximum number of the layers supported by the terminal device in the downlink,
the fifth information indicates a fourth maximum number of the layers,
in a case that the fifth information for the first downlink component carrier corresponding to the first bandwidth class of the first band in the first band combination is not configured for the terminal device, a fifth maximum number of the layers assumed for determining a bit width for the RI is given by referring to any one of the first information and the third information, and
in a case that the fifth information for the first downlink component carrier corresponding to the first bandwidth class of the first band in the first band combination is configured for the terminal device, the fifth maximum number of the layers assumed for determining the bit width for the RI is given by referring to the fifth information.

8. The base station device according to claim 7, wherein
in a case that the fifth information for the first downlink component carrier corresponding to the first bandwidth class of the first band in the first band combination is configured for the terminal device, and a second transmission mode for the PDSCH transmission for the first downlink component carrier is configured for the terminal device,
the fifth maximum number of the layers assumed for determining the bit width for the RI is determined according to at least a third maximum number of the layers indicated by the fifth information.

9. The base station device according to claim 7, wherein
in a case that the fifth information for the first downlink component carrier corresponding to the first bandwidth class of the first band in the first band combination is not configured for the terminal device, a first transmission mode for the PDSCH transmission for the first downlink component carrier is configured for the terminal device, and the third information is included in the capability information,
the fifth maximum number of the layers assumed for determining the bit width for the RI is determined according to a minimum of (i) a configured number of first ports and (ii) the second maximum number of the layers indicated by the third information, and
the first port is a transmit antenna port for a Chanel State Information-Reference Signal (CSI-RS).

10. The base station device according to claim 7, wherein
in a case that the fifth information for the first downlink component carrier corresponding to the first bandwidth class of the first band in the first band combination is not configured for the terminal device, a first transmission mode for the PDSCH transmission for the first downlink component carrier is configured for the terminal device, and the third information is not included in the capability information,
the fifth maximum number of the layers assumed for determining the bit width for the RI is determined according to a minimum of (i) a configured number of first ports and (ii) the first maximum number of the layers corresponding to the first information, and
the first port is a transmit antenna port for a Chanel State Information-Reference Signal (CSI-RS).

11. The base station device according to claim 7, wherein
in a case that the fifth information for the first downlink component carrier corresponding to the first bandwidth class of the first band in the first band combination is not configured for the terminal device, and a second transmission mode for the PDSCH transmission for the first downlink component carrier is configured for the terminal device,
the fifth maximum number of the layers assumed for determining the bit width for the RI is determined according to a minimum of (i) a number of second ports and (ii) the first maximum number of the layers corresponding to the first information, and
the second port is a transmit antenna port for a Physical Broadcast CHannel (PBCH).

12. The base station device according to claim 7, wherein the reception circuitry is configured to receive the RI on a Physical Uplink Shared CHannel (PUSCH).

13. A communication method used for a terminal device, the method comprising the steps of:
transmitting a Rank Indicator (RI) determined by the terminal device, the RI corresponding to a number of useful layers and corresponding to Physical Downlink Shared CHannel (PDSCH) transmission in a first downlink component carrier corresponding to a first bandwidth class of a first band in a first band combination;
receiving the PDSCH;
transmitting capability information including first information, second information, and/or third information; and
receiving fifth information for the first downlink component carrier corresponding to the first bandwidth class of the first band in the first band combination,
wherein the first information indicates a UE category corresponding to a first maximum number of the layers supported by the terminal device in a downlink,
the second information indicates the first bandwidth class being for the first band in the first band combination and corresponding to a number of downlink component carriers supported by the terminal device, the third information is applied to all of one or more downlink component carriers corresponding to the first bandwidth class of the first band in the first band combination, and indicates a second maximum number of the layers supported by the terminal device in the downlink, the fifth information indicates a fourth maximum number of the layers, in a case that the fifth information for the first downlink component carrier corresponding to the first bandwidth class of the first band in the first band combination is not configured, a fifth maximum number of the layers assumed for determining a bit width for the RI is given by referring to any one of the first information and the third information, and in a case that the fifth information for the first downlink component carrier corresponding to the first bandwidth class of the first band in the first band combination is configured, the fifth maximum number of the layers assumed for determining the bit width for the RI is given by referring to the fifth information.

14. A communication method used for a base station device, the method comprising the steps of:

receiving, from a terminal device, a Rank Indicator (RI) determined by the terminal device, the RI corresponding to a number of useful layers and corresponding to Physical Downlink Shared CHannel (PDSCH) transmission in a first downlink component carrier corresponding to a first bandwidth class of a first band in a first band combination;

transmitting the PDSCH to the terminal device;

receiving, from the terminal device, capability information including first information, second information, and/or third information; and transmitting, to the terminal device, fifth information for the first downlink component carrier corresponding to the first bandwidth class of the first band in the first band combination, wherein the first information indicates a UE category corresponding to a first maximum number of the layers supported by the terminal device in a downlink, the second information indicates the first bandwidth class being for the first band in the first band combination and corresponding to a number of downlink component carriers supported by the terminal device, the third information is applied to all of one or more downlink component carriers corresponding to the first bandwidth class of the first band in the first band combination, and indicates a second maximum number of the layers supported by the terminal device in the downlink, the fifth information indicates a fourth maximum number of the layers, in a case that the fifth information for the first downlink component carrier corresponding to the first bandwidth class of the first band in the first band combination is not configured for the terminal device, a fifth maximum number of the layers assumed for determining a bit width for the RI is given by referring to any one of the first information and the third information, and in a case that the fifth information for the first downlink component carrier corresponding to the first bandwidth class of the first band in the first band combination is configured for the terminal device, the fifth maximum number of the layers assumed for determining the bit width for the RI is given by referring to the fifth information.

* * * * *